Figure 1:
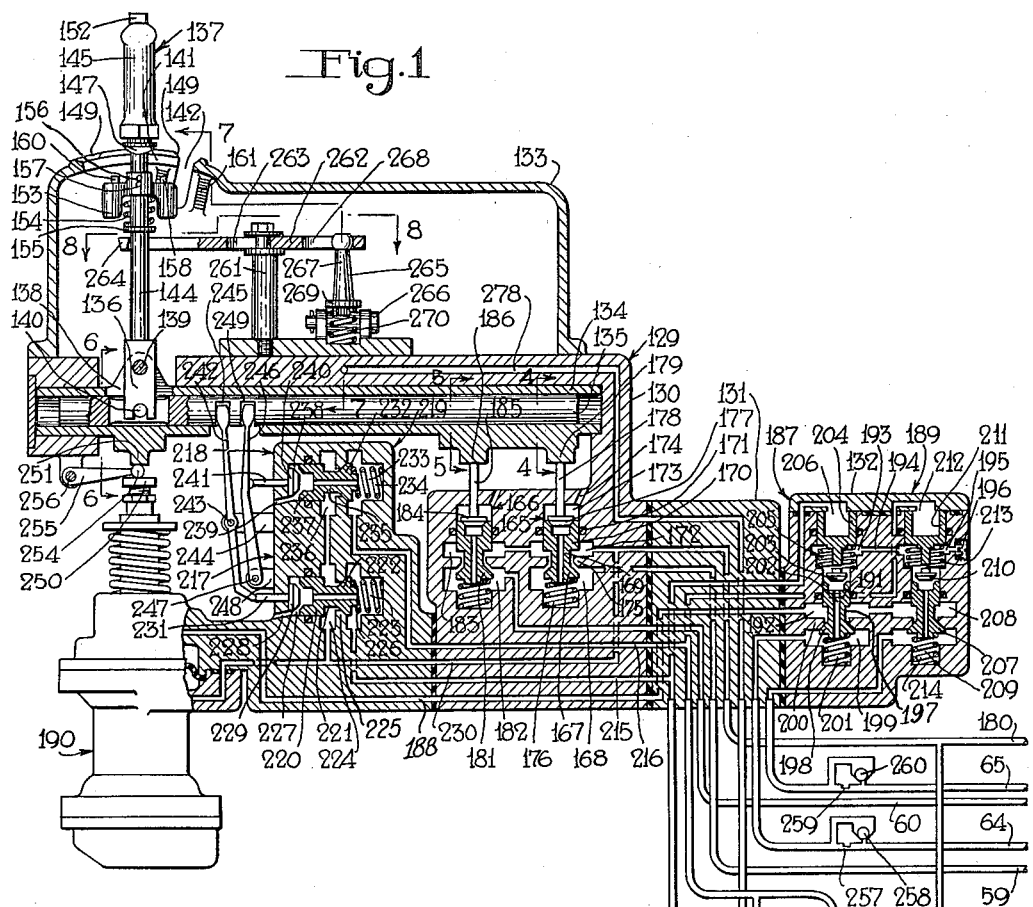
Figure 4:
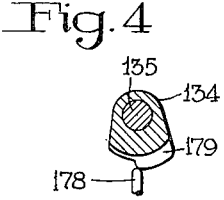
Figure 5:
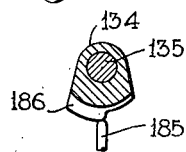
Figure 6:
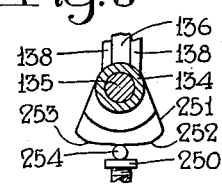

March 28, 1950 — H. C. MAY — 2,501,729
PRIME MOVER CONTROL APPARATUS OF THE FLUID PRESSURE TYPE
Filed Aug. 23, 1944 — 4 Sheets-Sheet 1

INVENTOR
Harry C. May
BY A. L. Vencill
ATTORNEY

March 28, 1950
H. C. MAY
2,501,729
PRIME MOVER CONTROL APPARATUS OF
THE FLUID PRESSURE TYPE
Filed Aug. 23, 1944
4 Sheets-Sheet 3
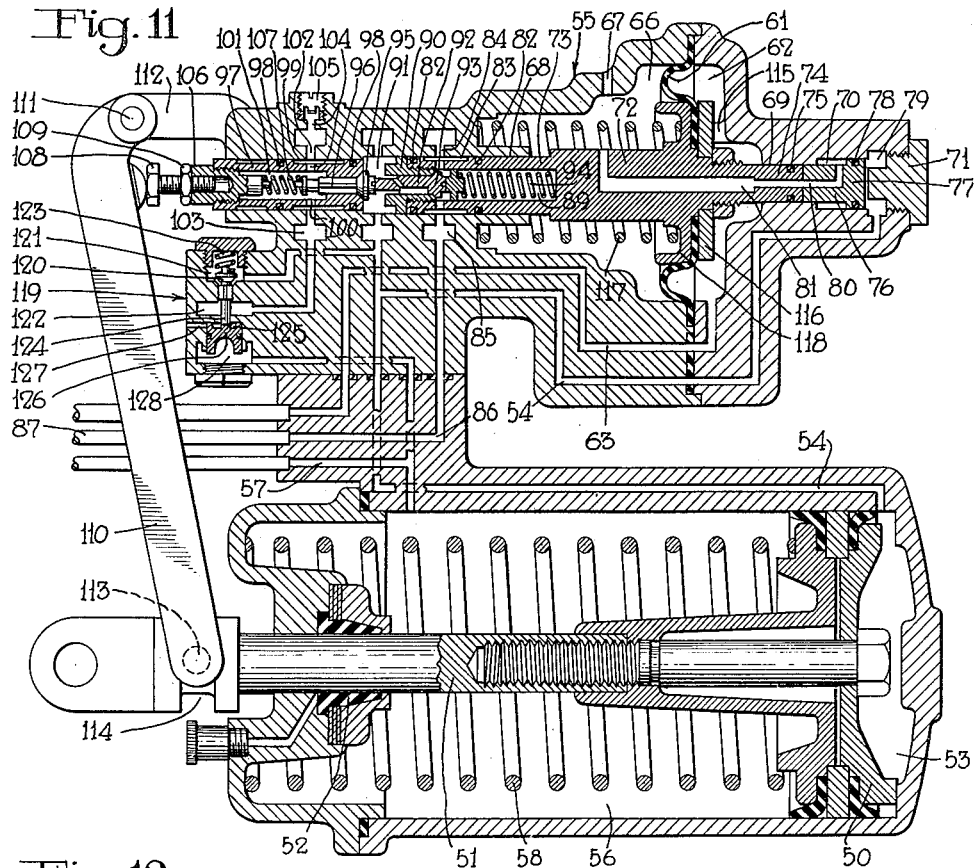
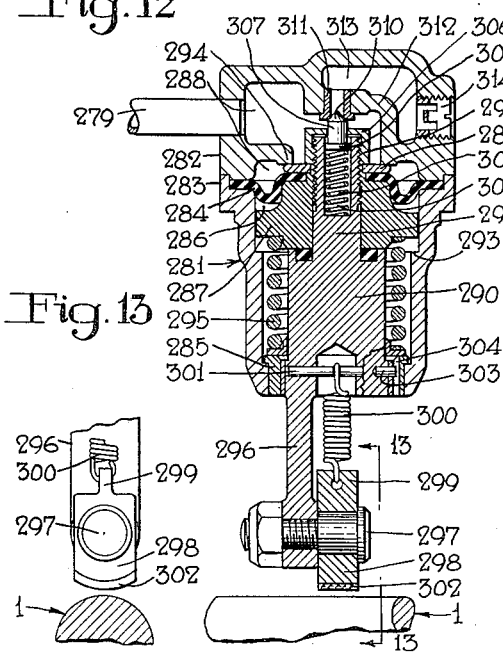
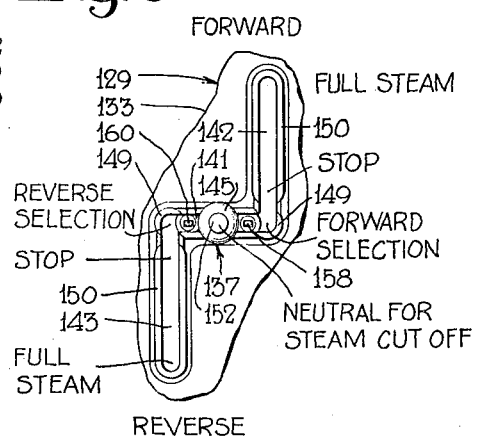
INVENTOR.
Harry C. May
BY
ATTORNEY March 28, 1950

H. C. MAY 2,501,729

PRIME MOVER CONTROL APPARATUS OF
THE FLUID PRESSURE TYPE

Filed Aug. 23, 1944

4 Sheets-Sheet 4

INVENTOR.
Harry C. May
ATTORNEY

Patented Mar. 28, 1950

2,501,729

UNITED STATES PATENT OFFICE 2,501,729

PRIME MOVER CONTROL APPARATUS OF THE FLUID PRESSURE TYPE

Harry C. May, East McKeesport, Pa., assignor to The Westinghouse Air Brake Company, Wilmerding, Pa., a corporation of Pennsylvania Application August 23, 1944, Serial No. 550,691

22 Claims. (Cl. 60—97)

This invention relates to control apparatus and more particularly to the fluid pressure type for selectively controlling a plurality of different operations such as those relating to the control of a reversible prime mover.

One object of the invention is the provision of a fluid pressure control apparatus for controlling the starting, running, reversing and the power output or speed of a prime mover, such as a reversible steam driven locomotive.

Another object of the invention is the provision of such an apparatus embodying means operative to prevent application of power to the prime mover for reversing its direction of movement until after the prime mover has come to a complete stop.

Another object of the invention is the provision of a control apparatus such as above defined embodying means operable automatically to limit the speed of the prime mover in both directions of operation.

A further object of the invention is the provision of a control apparatus for a locomotive of the type embodying a pressure lubricating system, so constructed as to cut off the supply of motive power in case the pressure of lubricant in said system becomes reduced to an undesirable low degree.

According to the above objects, the control apparatus is particularly adapted though not limited, for use in controlling a rail locomotive of the type embodying a forward steam turbine for driving the locomotive in an ahead direction and a reverse steam turbine for driving the locomotive in the reverse direction. An operator's control device is provided for selectively supplying steam to either one of the turbines, and means responsive to movement of the locomotive is operative to prevent the supply of steam to the forward turbine while the locomotive is moving in reverse or to the reverse turbine while the locomotive is moving forward, since it is not desired to use the turbines for braking purposes. A pressure lubricating system is provided for maintaining a supply of lubricant under constant pressure to the bearings of the turbines and other parts of the locomotive, and the control apparatus embodies means controlled by the pressure of lubricant in said system for automatically cutting off the supply of steam to the driving turbine in case the pressure of lubricant becomes reduced to a chosen low degree, due for instance to a failure in any part of the lubricating system. A warning device, also controlled by the pressure in the lubricating system, is provided to warn the operator in case the pressure of lubricant becomes reduced to an undesirably low degree. The control apparatus further embodies means responsive to the speed of the respective turbine and consequently to the movement of the locomotive in either direction of operation for limiting the maximum speed of the locomotive, and said means is also operable in case of slipping of the locomotive driver's on the rails to cut off the supply of steam to the driving turbine so as to limit the speed or prevent racing of said turbine.

Other objects and advantages will be apparent from the following more detailed description of the invention.

Figure 2:
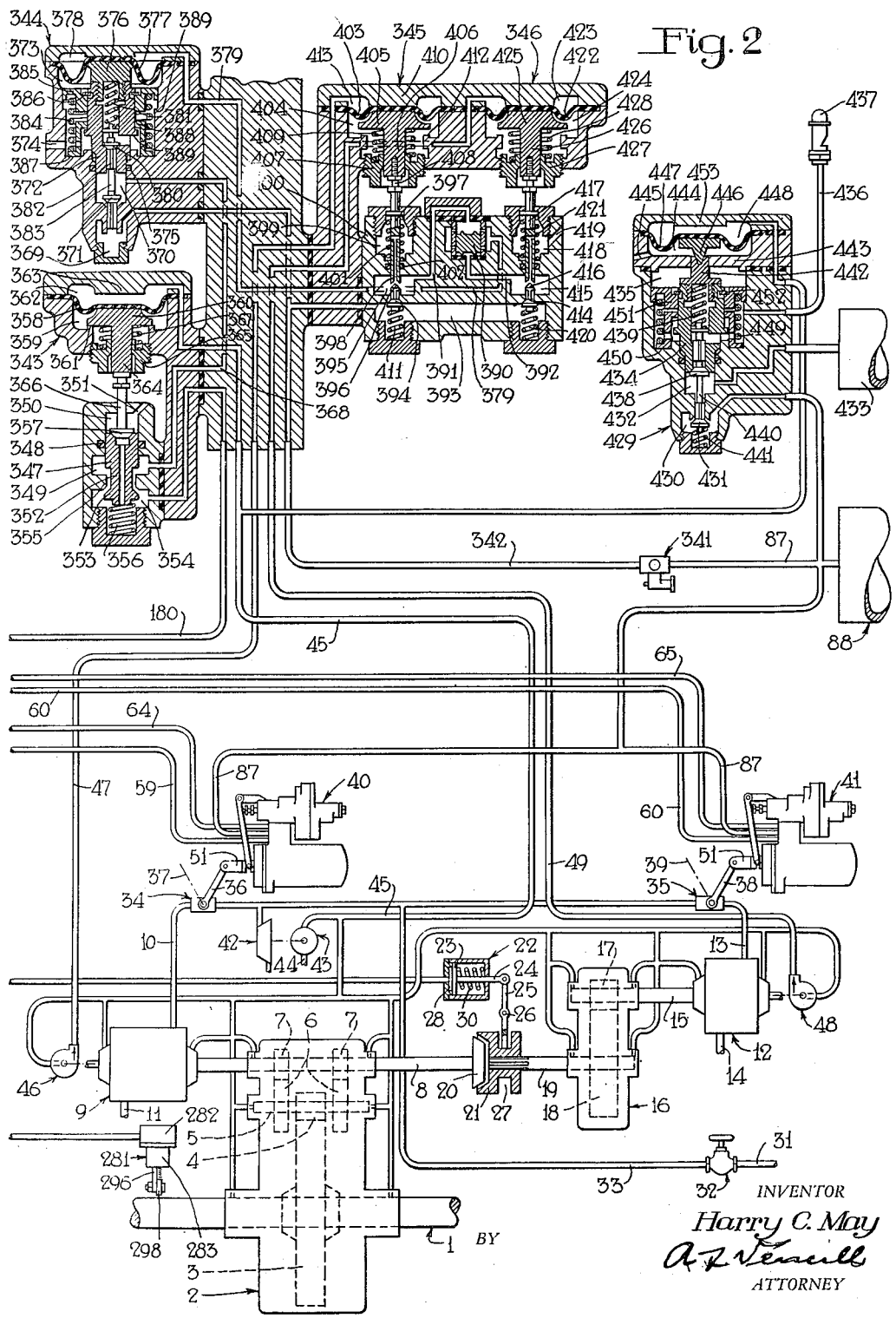
Figure 7:
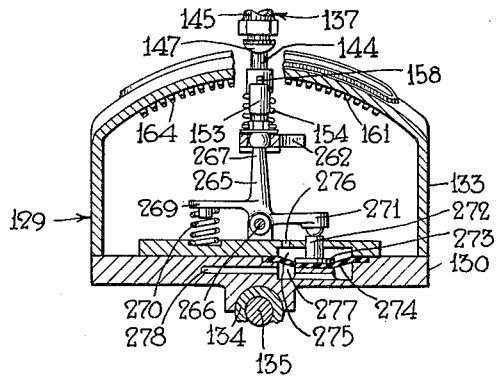
Figure 8:
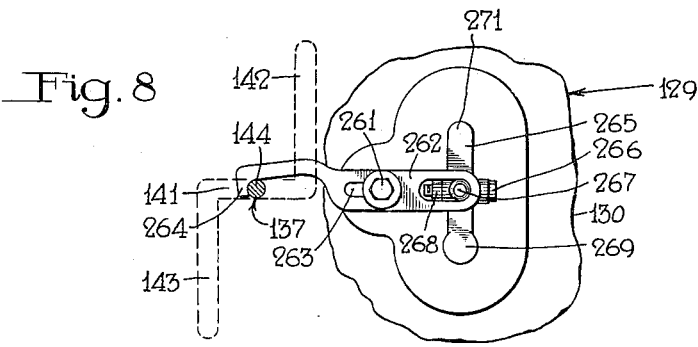
Figure 9:
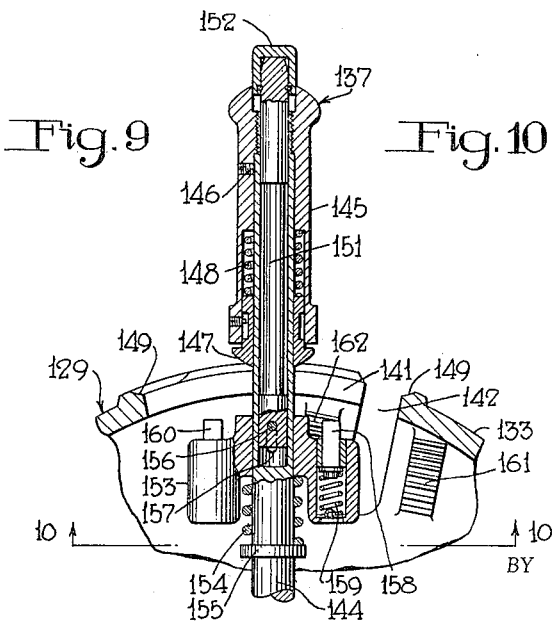
Figure 10:
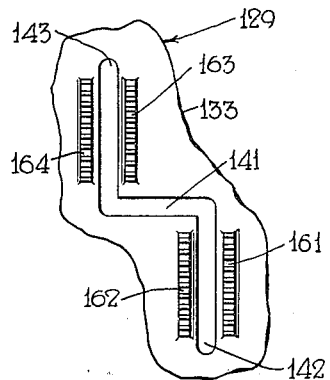

In the accompanying drawings; Figs. 1 and 2 when laid side by side with Fig. 1 at the left hand side of Fig. 2, is a diagrammatic view, partly in section and partly in elevation, of a portion of a locomotive with the improved control apparatus associated therewith; Fig. 3 is a partial plan view of an operator's control device which, in Fig. 1, is shown mainly in vertical section; Figs. 4 to 8 are sectional views taken respectively on lines 4—4, 5—5, 6—6, 7—7 and 8—8 on the operator's control valve device shown in Fig. 1; Fig. 9 is a view at an enlarged scale and mainly in section of a portion of the operator's control device shown in Fig. 1; Fig. 10 is a partial plan view of the interior of a portion of the operator's control device as seen on line 10—10 in Fig. 9; Fig. 11 is a vertical sectional view of a throttle adjusting motor two of which are shown in side elevation in Fig. 2; Fig. 12 is a vertical sectional view at an enlarged scale of a zero speed or stop detecting device shown in side elevation in Fig. 2; and Fig. 13 is a side elevational view of a portion of the device shown in Fig. 12 as seen from the line 13—13 in Fig. 12.

Description

In the drawings the reference numeral 1 indicates a drive axle of a rail locomotive. A reduction gear housing 2 is mounted on axle 1 and contains a driving gear wheel 3 secured to the axle 1 for turning same. This driving gear wheel is arranged to be operated by a smaller gear wheel 4 mounted on a jack shaft 5 which is journaled in the housing 2. The shaft 5 is arranged to be driven by gear wheels 6 which mesh with smaller driving gear wheels 7 mounted on and arranged to be driven by a shaft 8 having bearings in the housing 2 and extending out from either side thereof.

One end of shaft 8 is permanently connected to a forward steam turbine 9 which is arranged to be operated by steam supplied through a pipe 10 for driving axle 1 to propel the locomotive in a forward direction. Numeral 11 indicates an exhaust pipe from the turbine 9.

A reverse turbine 12 arranged to be operated by steam supplied through a pipe 13 and having a steam exhaust pipe 14 is adapted to drive a shaft 15. The shaft 15 extends into a reduction gear housing 16 containing meshing gear wheels 17 and 18, the gear wheel 17 being secured to said shaft and the gear wheel 18 being secured to a shaft 19 which is journaled in said housing in coaxial relation with shaft 8 connected to the forward turbine 9. A clutch element 20 is rigidly secured to shaft 8 to rotate therewith, and mounted on the adjacent end of shaft 19 is a movable clutch element 21 arranged to cooperate with the fixed clutch element 20 to operatively connect the reverse turbine 12 to the axle 1.

It will be noted that the forward turbine 9 is at all times connected to the locomotive axle while the reverse turbine may be connected or disconnected as the case may be. Thus when the reverse turbine 12 is employed for driving the locomotive the rotor (not shown) of the forward turbine will also be operated, but the clutch elements 20 and 21 provide for the disconnecting of the reverse turbine from the drive shaft 8 when the engine is being driven by the forward turbine.

For operating the clutch to connect and disconnect the reverse turbine to and from the drive shaft 8 there is provided a fluid pressure controlled motor comprising a cylinder 22 containing a piston 23 which is operatively connected through a rod 24 to one end of a lever 25. This lever is arranged to rock about a fixed fulcrum 26 provided intermediate its ends. The opposite end of the lever is in the form of a yoke straddling the movable clutch element 21 and has operating engagement therewith within an annular groove 27. At one side of the piston 23 there is provided a pressure chamber 28 which is arranged to receive fluid under pressure from a clutch control pipe 29 for actuating said piston to rock the lever 25 in a clockwise direction to urge the movable clutch element 21 into driving engagement with the fixed clutch element 20 to thereby operatively connect the reverse turbine 12 to the drive shaft 8. At the other side of the piston there is provided a chamber which contains a spring 30 which functions to move the piston 23 to the position in which it is shown in the drawing upon the release of fluid under pressure from pipe 29 and chamber 28 for disengaging the movable clutch element 21 from the fixed clutch element 20 to thereby disconnect the reverse turbine 12 from the drive shaft 8.

The reference numeral 31 indicates a steam supply pipe on the locomotive and this pipe is arranged to be constantly supplied with steam from the locomotive boiler. A cut-off valve 32 is provided to open and close communication between the steam supply pipe 31 and a pipe 33, and when open will admit steam to the latter pipe and thereby to two throttle valve devices 34 and 35 which are adapted to regulate the supply of steam to pipes 10 and 13, respectively, and thus to the respective forward and reverse turbines 9 and 12.

The throttle valve device 34 may be of any suitable structure for regulating the supply of steam from pipe 33 to pipe 10 to effect operation of the turbine 9 at any desired speed or degree of power output, and for also cutting off the supply of steam to said turbine. For illustrative purposes only, the throttle valve device 34 is shown as being of the type arranged for control by movement of a lever 36 having a steam cut-off position in which it is shown in the drawings, and which is movable out of this position in a counterclockwise direction for supplying steam to the turbine in an amount proportional to the extent of such movement. A dot and dash line 37 indicates a position which the lever 36 may assume to provide a maximum amount of steam to the turbine 9.

The reverse throttle valve device 35 may be identical in construction to the forward throttle valve device 34 and may therefore comprise a lever 38 having a steam cut-off position in which it is shown in the drawing, and which is adjustable out of this position in a counterclockwise direction for varying the supply of steam to the reverse turbine in proportion to the extent of such movement. The lever 38 may have a position such as indicated by a dot and dash line 39 for providing a maximum amount of steam from pipe 33 to the reverse turbine 12.

Fluid pressure controlled throttle adjusting motors 40 and 41 are provided for adjusting the levers 36 and 38 of the forward and reverse throttle valve devices 34 and 35, respectively. The construction and operation of these throttle adjusting motors will be hereinafter more fully described.

The reference numeral 42 indicates a steam turbine which is connected to the steam pipe 33 and which is adapted to operate continuously, i. e., as long as there is steam pressure in said pipe. The turbine 42 is provided for operating a lubricant pump 43 to supply lubricant from a supply pipe 44 to a pipe 45 and to maintain lubricant at a certain substantially constant pressure, such as 35 pounds per square inch, in pipe 45 at all times when the locomotive is in use, said pipe 44 being supplied with oil from any suitable source, such as a sump (not shown).

The pipe 45 may convey lubricant under pressure from pump 43 to the different bearings in the forward and reverse turbines and in the reduction gears associated therewith and connecting said turbines to the axle 1 and to any other part or parts of the locomotive where such lubricant is desired. For instance the lubricant pipe 45 leads to the inlet of an impeller pump 46 arranged to be driven by the forward turbine 9. The pump 46 has an outlet to a pipe 47 whereby said pump will operate to draw oil from the constant pressure pipe 45 and deliver such oil to pipe 47 at a greater pressure which will be substantially proportional to the speed of operation of the forward turbine and thereby to the forward speed of the locomotive for reasons which will be hereinafter described. A similar impeller pump 48 is arranged to be driven by the reverse turbine 12. The pump 48 has an inlet connected to the constant pressure pipe 45 and has an outlet connected to a pipe 49 so as to thereby provide in this pipe 49 a pressure which will be proportional to the speed of the reverse turbine and thus of the locomotive when said turbine is used for propelling the locomotive rearwardly, also for a reason which will be hereinafter described.

The two throttle adjusting motors 40 and 41 are identical in construction, each comprising, as shown in Fig. 11, a casing containing a double acting power piston 50 having a rod 51 extending through a suitable packing gland 52 to the exterior of the casing. The outer end of rod 51 of motor 40 is operatively connected to one end of the lever 36 of the throttle valve device 34, while in motor 41 the end of said rod is connected to one end of lever 38 of the throttle valve device 35.

At one side of the power piston 50 there is provided a control chamber 53 which is connected by way of a passage 54 to a pilot structure 55 which is operative to vary the pressure of fluid in said chamber for controlling adjustment of the respective throttle valve device. At the opposite side of piston 50 there is provided a control chamber 56 which is connected to a control passage 57 and which contains a spring 58 acting on said piston for urging same in the direction of the right-hand to the position in which it is shown in the drawings. In motor 40 the passage 57 is connected to a pipe 59 while in motor 41 said passage is connected to a pipe 60.

In operation, when fluid is supplied to chamber 53 at a pressure sufficient to overcome the opposing pressure of spring 58, with chamber 56 open to atmosphere, the piston 50 will move against this opposing pressure of the spring, to a position in which the increase in pressure of said spring will counter-balance the pressure of fluid in chamber 43. Upon a partial release of fluid pressure from chamber 53, the spring 58 will act to return the piston 50 and rod 51 to a position where the pressure of said spring is reduced to a degree equal to that of the reduced pressure of fluid effective in chamber 53, while upon a full release of fluid pressure from chamber 53, spring 58 will return piston 50 to the position in which it is shown in the drawings. It will thus be apparent that the piston 50 may be caused to assume any position to the left of the position in which it is shown in Fig. 11 by providing fluid at the proper pressure in chamber 53.

With piston 50 in the position in which it is shown in Fig. 11 the lever 36 or 38 of the respective throttle valve device 34 or 35 will be caused to assume the steam cut-off position as shown in Fig. 2. The piston 50 as it is moved out of the position in which it is shown in Fig. 11 will operate lever 36 or 38 to effect the supply of steam to the turbine 9 or 12, respectively, in an amount proportional to the degree of such movement. It will thus be apparent that the amount of steam admitted to turbine 9 or 12 will vary in proportion to the pressure of fluid effective in chamber 53.

The pilot structure 55 for controlling the pressure of fluid in chamber 53 comprises a flexible diaphragm 61 at one side of which there is provided a chamber 62 to which is connected a control passage 63. The passage 63 in motor 40 is connected to a control pipe 64, while in motor 41 said passage is connected to a control pipe 65. At the opposite side of diaphragm 61 there is provided a chamber 66 which is open to the atmosphere through a port 67. The casing of this structure 55 is provided with bores 68 and 69 at opposite sides of and coaxially aligned with the diaphragm 61. One end of bore 68 is open to chamber 66. The adjacent end of bore 69 is open to chamber 62 while its opposite end is open to a larger bore 70 the outer end of which is closed by a cap nut 71.

A stem 72 extending centrally through the diaphragm 61 and secured thereto for movement therewith has one end portion 73 disposed to slide in the adjacent end portion of bore 68, while its opposite end portion 74 is mounted to slide in bore 69. The portion 74 adjacent its outer end is provided with an annular recess in which there is disposed a sealing ring 75 having sliding contact with the wall of the bore 69 for preventing leakage of fluid under pressure from chamber 62. The outer end of portion 74 of the stem 72 engages the smaller end portion of a plunger 76, the larger end portion 77 of which is disposed to slide in bore 70. In this larger end portion 77 is an annular groove carrying a sealing ring 78 arranged to prevent leakage of fluid under pressure from a chamber 79 at its outer face to the space between said ring and the sealing ring 75, this space being constantly open to atmosphere through a passage 80 in plunger 76 and a registering passage 81 which extends through stem 72 and is open to chamber 66 which is constantly in communication with the atmosphere by way of passage 67. Chamber 79 located at the outer face of larger end portion 77 of the plunger 76 is open to passage 54.

The end portion 73 of stem 72 disposed within bore 68, is provided with two spaced sealing rings 82 having sealing and sliding contact with the wall of said bore to prevent leakage of fluid under pressure past rings from an annular recess 83 provided in the peripheral surface of the stem and located between the rings. The recess 83 is open through a plurality of ports 84 to an annular recess 85 in the casing and thence through a passage 86 to a pipe 87, at both of the adjusting motors. The pipe 87 is constantly supplied with fluid under pressure from a source such as a conventional locomotive main reservoir 88.

In each of the throttle adjusting motors the recess 83 is also open to a counterbore 89 provided in the portion 73 of stem 72. The open end of counterbore 89 is closed by a nut 90 having sliding engagement with the wall of bore 68 and also having screw-threaded engagement with the internal wall of counterbore 89 and thus the nut is secured to the stem 72 for movement therewith. The nut 90 has an axial bore one end of which is open to a chamber 91 at the outer end of the nut while the opposite end is open to counterbore 89 within the stem, and slidably mounted in this axial bore is a fluted stem 92 projecting from a fluid pressure supply valve 93 contained in a counterbore 89 and arranged to seat against the adjacent inner end of said nut. A precompressed spring 94 disposed in counterbore 89 acts on the supply valve 93 for urging the valve to its seated or closed position as shown in Fig. 11.

The end of the supply valve stem 92 extends beyond the outer face of nut 90 into chamber 91 and therein engages a release valve 95 which has a fluted stem 96 slidably mounted in a bore provided axially in a plunger 97 which is mounted to slide in a bore in the casing in coaxial relation with the end portion 73 of the diaphragm operated stem 72. In the peripheral surface of plunger 97 are two spaced recesses, in each of which is a sealing ring 98 having sealing contact with the wall of the bore for preventing leakage of fluid under pressure from one side of each ring to the opposite side. Between the two rings 98 the plunger 97 has an annular recess 99 which is open through one or more ports 100 to a bore 101 within the plunger and into which bore the end of the release valve stem 96 projects. The recess 99 is also open through one or more ports 102 to a recess 103 in the casing. The recess 103 is in constant communication with the atmosphere through a passage 104 and a fitting 105 arranged to prevent entry of insects, into said passage.

The outer end of bore 101 in plunger 97 is closed by a plug 106 and between the inner end of said plug and the adjacent end of the release valve stem 96 there is interposed a precompressed spring 107 for urging the release valve 95 out of seating engagement with the end of the plunger 97. In the outer end of plug 106 there is secured an adjusting screw 108 and on said screw is a lock nut 109 for contacting plug 106 to lock said screw in an adjusted position. The outer end of the adjusting screw 108 bears against a lever 110, one end of which is mounted to rock on a pin 111 which is mounted in a fixed arm 112 projecting from the casing. The opposite end of the lever is operatively connected, exteriorly of the casing, to the power piston rod 51 by means of a lug 113 projecting from said lever into an annular groove 114 provided in said rod.

It will be noted that chamber 91 containing the release valve 95 is formed between the adjacent ends of the portion 73 of plunger 72 and plunger 97, and said chamber is open to passage 54 leading to chamber 53 at the right hand side of the power piston 50. The passage 54 is also open to chamber 79 provided at the outer face of plunger 76 as before mentioned and it is desired to point out that the enlarged portion 77 of said plunger is of the same area as that of the nut 90 provided on the end of portion 73 of plunger 72, whereby pressure of fluid effective in chamber 91 tending to urge the structure including diaphragm 61 in the direction of the right hand will be counter balanced by an equal pressure of fluid acting in the opposite direction in chamber 79 on the enlarged portion 77 of the plunger 76.

Carried by the casing and projecting into chamber 62 at the right hand side of diaphragm 61 is a stop 115 which is arranged to be engaged by a plate 116 secured to the stem 72 for limiting deflection of the diaphragm 61 in the direction of the right hand. If desired a plurality of such stops may be provided. In chamber 66 a precompressed control spring 117 encircles the stem 72. One end of this spring bears against a wall of the casing, while the opposite end bears against a follower 118 which is provided on stem 72 for engaging the adjacent face of diaphragm 61. This spring 117 is operative to urge the diaphragm 61 to the position in which it is shown in the drawings upon release of fluid pressure from chamber 62, and to oppose movement of said diaphragm in the direction of the left hand upon supply of fluid under pressure to said chamber, and to cooperate with such pressure to define different positions of said diaphragm. Preferably the spring 117 is precompressed to a degree which will move the diaphragm to the position shown in the drawing against a relatively low pressure of fluid in chamber 62, such as eight pounds.

Each of the throttle adjusting motors further embodies an insuring valve device 119 comprising a poppet valve 120 contained in a chamber 121 which is open to passage 54. The valve 120 has a fluted stem extending through a bore into a chamber 122 which is open to vent passage 104, said valve being thus arranged to control communication between passages 54 and 104, like the release valve 95, but under different conditions as will be later brought out. A spring 123 in chamber 121 acts on valve 120 for urging it to closed position.

The fluted stem of valve 120 engages in chamber 122 a cylindrical stem 124 which slidably extends through a bore in a wall separating chamber 122 from a chamber 125 provided at one side of a piston 126 to which the stem is connected. Chamber 125 is open to atmosphere through a passage 127, and at the opposite side of piston 126 is a pressure chamber 128 connected to passage 57.

The operation of the forward and reverse throttle adjusting motors 40 and 41, by reference to Fig. 11 will now be described.

Let it be initially assumed that the pressure of fluid in diaphragm chamber 62 is reduced to the low degree of eight pounds above mentioned by way of passage 63 and pipe 64 or 65 (Fig. 2). Under this condition spring 117 will maintain the diaphragm 61 and stem 72 in the position shown in Fig. 11 and the supply valve 93 will be closed by spring 94 to prevent flow of fluid from the main reservoir 88 past said valve to chamber 91. Chamber 91 and the connected chamber 79 and chamber 53 at the right hand face of the power piston 50 will, under this condition, be substantially at atmospheric pressure and the release valve 95 will be seated for reasons which will be apparent from the description to follow.

Chamber 53 being substantially at atmospheric pressure, spring 58 will maintain the power piston 50 in the position in which it is shown in the drawings. Thus when the pressure of fluid in diaphragm chamber 62 is at substantially eight pounds, the power piston 50 will actuate lever 36 or 38 of the respective throttle valve device 34 or 35 to cut off the supply of steam to the respective steam turbine 9 or 12.

Let it now be assumed that it is desired to supply steam to the forward turbine 9. To accomplish this, fluid under pressure will be supplied through pipe 64 to increase the pressure of fluid in chamber 62 in the throttle adjusting motor 40, and this increased pressure, acting on one side of diaphragm 61, will overcome the opposing force of control spring 117 and will cause said diaphragm to deflect in the direction of the left hand to a position where the increase in pressure of said spring will counter-balance the increased pressure of fluid in said chamber. As the diaphragm 61 is thus moved, the portion 73 of stem 72 will move relative to and thus out of seating engagement with the supply valve 93, since the supply valve is held against movement by engagement with release valve 95 which, at this time, is held against movement by plunger 97, lever 110 and a relatively great reluctance of the power piston 50 to movement.

Upon the opening of the supply valve 93, fluid under pressure from the main reservoir 88, supplied through pipe 87 to bore 89 containing the supply valve 93 will flow past said valve to chamber 91 and thence to chamber 53 at the right hand face of the power piston 50. When the pressure of fluid thus provided in chamber 53 becomes sufficient to overcome the opposing force of spring 58, the piston 50 will move in the direction of the left hand. After movement of diaphragm 61 ceases in a position of said diaphragm corresponding to the pressure of fluid provided in chamber 62, as above described, this movement of the power piston 50 will act through lever 110 to allow movement of plunger 97 by pressure of fluid effective in chamber 91 in a direction away from the nut 90, and this movement of said plunger will permit movement of the supply valve 93 by spring 94 toward its seat. The supply valve will finally engage its seat in a position of the power piston corresponding to the position of said seat as predetermined by the pressure of controlling fluid provided in chamber 62. When the supply valve 93 closes, the flow of fluid under pressure to chamber 53 will stop and hence movement of the power piston 50 will cease in a position corresponding to the pressure of fluid effective in chamber 62.

It will thus be seen that upon a certain deflection of diaphragm 61, as determined by the pressure of fluid provided in chamber 62, the power piston will adjust the respective throttle control lever 36 out of its steam cut off position shown in Fig. 2 to supply steam to the forward turbine 9 in an amount proportional to the pressure of fluid provided in chamber 62 in excess of the initial eight pounds pressure effective in chamber 62.

If the respective throttle valve device 34 is adjusted as just described to provide less than full steam supply to the forward turbine, the supply of steam may be increased by increasing the pressure of fluid in diaphragm chamber 62, whereupon the throttle adjusting motor 40 will operate to correspondingly increase the supply of steam to the forward turbine. Upon providing a maximum pressure of fluid in chamber 62 the throttle adjusting motor 40 will cause movement of the throttle control lever 36 to the position indicated by the dot and dash line 37 for supplying the maximum amount of steam to the turbine.

On the other hand, if the operator desires to reduce the amount of steam supplied to the forward turbine 9 he will reduce the pressure of fluid in diaphragm chamber 62 to a desired degree. Spring 117 will then move the diaphragm 61 in the direction of the right-hand to a new position corresponding to the reduced pressure of fluid. As the diaphragm 61 is thus moved toward the right hand, it will carry with it the supply valve 93 and the supply valve stem 92, thus rendering spring 107 effective to move the release valve 95 with the supply valve and relative to the plunger 97 out of seating engagement with said plunger. Upon this opening of the release valve 95, fluid under pressure will be released from chamber 91 and thus from chamber 53 at the right hand face of the power piston 50 to atmosphere through passage 104. When the pressure of fluid in chamber 53 in thus reduced, the spring 58 will move the power piston 50 in the direction of the right hand. The piston as it is thus moved will operate the lever 110 to move the plunger 97 in the direction of the release valve 95. After movement of the diaphragm 61 and release valve 95 ceases in a position corresponding to the reduced pressure of fluid in chamber 62, this movement of plunger 97 will be relative to said valve and will finally effect closure of said valve to prevent further release of fluid under pressure from chamber 53 so as to stop piston 50 in a position corresponding to the reduced pressure of fluid in diaphragm chamber 62. This movement of piston 50 will operate the throttle valve 34 to correspondingly reduce the amount of steam supplied to the turbine 9, as will be apparent.

If a further release of fluid under pressure from chamber 62 is effected, the power piston 50 will again move in the direction of the right hand to a correspondingly new position to effect a further and corresponding reduction in the supply of steam to turbine 9, in the same manner as just described. However, upon reducing the pressure of fluid in chamber 62 to its minimum degree, such as the eight pounds above mentioned, the diaphragm 61, supply valve 93 and release valve 95 will return to the position in which they are shown in the drawings, whereupon the power piston chamber 53 will be maintained open to the atmosphere past the release valve 95 until said piston reaches the position in which it is shown in the drawings, at which time, plunger 97 will seat against the release valve 95, and this operation of piston 50 will actuate the steam throttle valve device 34 to cut off all steam supply to the turbine 9.

It will now be seen that any desired amount of steam may be supplied to the forward turbine 9 by providing fluid at the proper selected pressure in pipe 64 while a reduction in pressure of fluid in said pipe to its normal minimum degree will effect the cutting off of the supply of steam to the forward turbine.

In a manner which will be apparent from the above description, it will also be seen that the supply of steam to the reverse turbine 12 may be varied as desired or may be cut off by providing fluid at suitable pressures in the control pipe 65 for controlling operation of the reverse throttle adjusting motor 41.

In the operation above described, it will be noted that the cutting off of the supply of steam to either the reverse or forward turbine, upon release of fluid under pressure from chamber 53 in the respective throttle adjusting motor is dependent upon and effected by spring 58 acting on the power piston 50.

In order to positively ensure that the supply of steam will be cut off to the non-operating turbine or turbines, i. e., to the reverse turbine 9 when steam is being supplied to the forward turbine 12, and vice versa, and to both turbines when it is desired to stop the locomotive or hold it stopped, particularly in case spring 58 in the respective throttle adjusting motor 40 or 41 should become broken fluid under pressure will be supplied through passage 57 to chamber 56 by means to be later described, which will act to move the piston 50 to its steam cut off position, in which it is shown in Fig. 11, with the fluid pressure released from chamber 53. To ensure the release of fluid pressure from chamber 53 under such conditions, even though spring 117 acting on the diaphragm 61 or spring 107 acting on the release valve 95 should fail or become broken, which would prevent opening of the release valve 95, the ensuring valve piston 126 will be operated by fluid pressure supplied to passage 57 to unseat valve 120 so as to thereby open chamber 53 to atmosphere through the communication by-passing said release valve. During operation of the throttle adjusting motors 40 and 41 for supplying steam to the respective turbines, spring chamber 56 and piston chamber 128 will be open to atmosphere and as a result the insuring valve 120 will be closed.

The selective control of the forward and reverse throttle adjusting motors 40 and 41 and of the clutch control cylinder 22, in accordance with the desired direction of movement and stopping of the locomotive, is arranged to be controlled by an operator's control valve device 129. The control device 129 comprises a body portion 130 which is mounted on one face of a pipe bracket 131; a throttle adjusting motor selector valve portion 132 which is mounted on another face of said bracket; and a cover 133 which is mounted on the body portion 130.

The body portion 130 carries a hollow rock shaft 134 suitably journaled at opposite ends and secured against longitudinal movement, and mounted to slide within said rock shaft longitudinally thereof is a plunger 135. Adjacent one end, the rock shaft is provided through one side with a slot, and the plunger 135 has an aligned through slot, and extending through the slot in the rock shaft and into the slot in the plunger is an end portion 136 of an operator's control lever 137. The rock shaft 134 is provided at either side of its slot with spaced upstanding ears 138 between which the portion 136 of the operator's control lever is disposed. Extending through the ends of the ears 138 and through the interposed portion of the control lever 137 is a pivot pin 139 for said lever, said pin being arranged at right angles to the axis of the rock shaft. In the inner end of the portion 136 of the operator's control lever is a recess in which is disposed a pin 140 which is secured in plunger 135. By this structure it will be seen that movement of the operator's control lever 137 about pin 139 in the direction of the length of rock shaft 134 will move the plunger 135 longitudinally in said rock shaft, while movement of the lever in a direction circumferentially of the rock shaft will turn said shaft and plunger in unison.

The cover 133 is provided with a slot through which the operator's control lever 137 extends and which is adapted to define the path of movement of said lever. This slot comprises a central portion 141 which extends parallel to the direction of the length of the rock shaft 134, and also comprises two oppositely extending portions 142 and 143 which are arranged at right angles to the central portion 141 and which open respectively to opposite ends of said central portion.

The operator's control lever 137 has a "Neutral" position midway between the ends of the central portion 141 of the slot, in which position said lever is shown in the different views of the drawings. The lever 137 is movable in one direction from "Neutral" position to what may be called a "Forward selection" position at the junction of the parts 141 and 142 of the slot and then to a "Stop" position a slight distance into the slot 142 from the "Forward selection" position. At the opposite or outer end of the portion 142 of the slot the lever 137 has a "Full steam" position, the range of movement of the lever between the "Stop" position and the "Full steam" position constituting a speed control range or zone and providing for varying the supply of steam to the forward turbine 9 from, respectively, a minimum amount to a maximum amount. The minimum amount is less than required to cause operation of the forward turbine 9 to propel the locomotive and is substantially equal to the steam slip in the turbine so as to maintain the turbine warm when stopped in order that it will be in condition to operate efficiently when required for propulsion. The lever 137 has at the opposite end of the portion 141 of the slot a "Reverse selection" position and in the portion 143 of the slot "Stop" and "Full steam" positions for controlling the reverse turbine 12, the space between said "Stop" and "Full steam" positions constituting a steam varying range for said turbine, and the "Stop" position also providing for supply of steam to the reverse turbine equal substantially to the turbine slip for the same reasons as above set forth in connection with turbine 9. In portion 141 of the slot all steam to the turbines will be cut off as will be described in greater detail hereinafter.

These different positions of lever 137 are indicated in Fig. 3 by appropriate legends, there also being shown the legend "Forward" at the remote end of the portion 142 of the slot and the legend "Reverse" at the opposite end of the portion 143 of the slot, which last two mentioned legends indicate the directions of movement of the lever from "Neutral" position for obtaining ahead or reverse operation of the locomotive.

As shown in Figs. 1 and 9 the operator's control lever 137 within the cover 133 comprises a rod 144 and, outside of the cover, comprises a hand grip portion 145 which is secured to said rod by screw-threaded engagement and by a set screw 146. Slidably mounted on the rod between the hand grip portion 145 and the cover, is a detent 147, and carried within the hand grip portion and acting on said detent is a precompressed spring 148 urging said detent against said cover. As shown in Figs. 1, 3 and 9 the cover is provided at each of the opposite ends of the central portion 141 of the guide slot with a recess 149 arranged to receive the detent 147 for resiliently holding said lever in either of said positions. Each of the portions 142 and 143 of the guide slot is provided with an elongated recess 150 which is adapted to receive the detent 147 and which provides for relatively free movement of the operator's control lever between the "Stop" and the "Full steam" positions, the detent being operative however to prevent unintentional movement from either "Stop" position to the adjacent "Forward selection" position or "Reverse selection" position.

The rod 144 is provided with a counterbore extending from the outer end of the operator's control lever to a point within the cover 133, and slidably mounted within this bore, is a plunger 151. One end of plunger 151 is disposed adjacent the inner end of the counterbore and on the opposite end of the plunger there is secured a finger operated cap 152 which projects beyond the outer end of the hand grip portion 145 of the lever, whereby the plunger may be moved inwardly of the rod 144 by pressure from an operator's finger. A double detent 153 is slidably mounted on the rod 144 within the cover 133, and a spring 154 encircling said rod and supported on a collar 155 secured to said rod acts on said detent urging same in the direction of the inner surface of the cover. This detent is connected by a pin 156 to the plunger 151, said pin extending through suitable oppositely arranged slots 157 in the rod 144. These slots are so arranged as to be engaged at one end by pin 156 to limit upward movement of the detent 153 and plunger 151 by spring 154 and to permit movement of said detent in the opposite direction away from the inner surface of the cover by manual operation of said plunger.

The detent 153 is provided, on the side of rod 144 which is adjacent the portion 142 of the slot, with a plunger 158 which is urged in the direction of the inner surface of the cover by a spring 159. A like spring pressed plunger 160 is provided in the detent at the opposite side of rod 144. Along the inner surface of the cover and adjacent opposite sides of the portion 142 of the slot are two gear toothed racks 161 and 162 which extend between the "Stop" and "Full steam" positions for cooperation with the ends of plungers 158 and 160, respectively, to secure the operator's control lever 137 in any selected speed or steam supply position within this part of the slot. Oppositely arranged toothed racks 163 and 164 are provided along the opposite sides of the portion 143 of the slot between the "Stop" and "Full steam" positions for cooperation with plungers 158 and 160 respectively, to secure the operator's control lever in any selected position within this part of the slot. It will be seen that the plungers 158 and 160 may be released from the respective racks by moving plunger 151 inwardly by manual pressure applied to the cap 152 projecting from the outer end of the hand grip portion 145 of the operator's control lever.

The teeth in each pair of racks 161, 162 and 163, 164 may be arranged in staggered relation, so that when plunger 158 enters a space between two teeth on the respective rack 161 or 163, the plunger 160 will be engaging the end of a tooth on its rack 162 or 164, and vice versa, whereby the operator's control lever 137 will have a number of positions along each pair of racks equal to the sum of the spaces between the teeth on the pair of racks. In order to allow movement of one of the plungers into a space between teeth on its rack under the action of spring 154 when the other plunger engages the end of a tooth on its rack, the respective spring 159 acting on the other plunger will yield.

If desired, however, the teeth on each pair of racks may be aligned with each other so that the plungers 158 and 160 will at the same time enter recesses in the respective racks. In such a structure the number of positions of the operator's control lever will equal only the number of recesses between teeth on one rack. By this arrangement the springs 159 could be dispensed with and the plungers 158 and 161 could be secured against movement in the detent 153 and might, if desired, be made integral parts of the detent.

Associated with the body portion 130 of the operator's control valve device is a forward steam cut-off valve device 165 and a reverse steam cut-off valve device 166.

The forward steam cut-off valve device 165 comprises a supply valve 167 which is contained in a chamber 168 and which is connected by a stem 169 to a plunger 170 slidably mounted in a suitable bore in the casing. The casing has an annular recess encircling the plunger 170 and containing a sealing ring 171 having sealing and sliding contact with the outer peripheral surface of the plunger for preventing leakage of fluid under pressure from a chamber 172 to a chamber 173, the latter chamber being open to the atmosphere through a port 174. A wall 175 separates chamber 168 from chamber 172 and the stem 169 extends through an opening in this wall, the wall being provided, in chamber 168, with a seat around said opening for engagement by the valve 167. A spring 176 in chamber 168 acts on the supply valve 167 for urging it into contact with its seat. The supply valve 167, stem 169 and plunger 170 are provided with an axial bore which is open at one end to chamber 168 and which is open through a valve seat at the opposite end to chamber 173 which contains a release valve 177 arranged to cooperate with said seat for controlling the release of fluid under pressure from chamber 168 to chamber 173. The release valve 177 is carried by a stem 178 which is disposed directly below the axis of rock shaft 134.

The shaft 134 is provided with a cam 179 arranged to contact the release valve stem 178. The cam 179 is so designed as to effect movement of valve 177 into contact with its seat and to then act through plunger 170 and stem 169 to move the supply valve 167 out of engagement with its seat, with the operator's control lever disposed in the portions 141 and 143 of the slot, and to permit the closing of the supply valve 167 by spring 176 and the opening of the release valve 177 by pressure of fluid from chamber 168 with the operator's control lever in any position between and including "Stop" and "Full steam" positions in the portion 142 of the slot.

Chamber 172 is arranged to be constantly supplied with fluid under pressure from a fluid pressure supply pipe 180 while the locomotive is in use. Chamber 168 is connected to pipe 59 which leads to spring chamber 56 in the forward throttle adjusting motor 40. It will thus be seen that with the operator's control lever 137 in any position between and including the "Stop" and "Full steam" positions in the portion 142 of the slot, which provides for control of the forward throttle adjusting motor 40, the spring chamber 56 in said adjusting motor 40 will be open to atmosphere to provide for operation of said motor by fluid under pressure supplied to chamber 53 for controlling the steam supply to the forward turbine 9, while in all other positions of said lever, fluid under pressure will be supplied to spring chamber 56 in the forward throttle adjusting motor to insure operation thereof to cut-off the supply of steam to the forward turbine 9.

The reverse steam cut-off valve device 166 is structurally identical to the forward steam cut-off valve device 165 and comprises a supply valve 181 contained in a chamber 182 which is connected to pipe 60 leading to the reverse throttle adjusting motor 41, said valve being arranged to control the supply of fluid under pressure from a chamber 183 to chamber 182, the chamber 183 being constantly supplied with fluid under pressure from the supply pipe 180 by way of chamber 172. The reverse steam cut-off valve device further comprises a release valve 184 and an operating stem 185 arranged to cooperate with a cam 186 on the rock shaft 134. The cam 186 is formed just the reverse of cam 179 so that with the operator's control lever in the reverse speed control zone, that is to say, in and between the "Stop" and "Full steam" positions in the portion 143 of the slot, the spring chamber 56 in the reverse throttle adjusting motor 41 will be open to atmosphere to provide for adjustment of said motor by the pressure of fluid in chamber 53, while in all other positions of the operator's control lever the reverse steam cut-off valve device 166 will act to supply fluid under pressure to spring chamber 56 in the reverse throttle adjusting motor 41 to insure operation thereof to cut-off the supply of steam to the reverse turbine 12.

The forward and reverse cut-off valve devices 165 and 166 will thus act to ensure the cutting off of steam to both turbines when the controlling lever is in the central portion 141 of the slot, and will ensure that the supply of steam to the reverse turbine 12 will be cut-off when the operator's control lever is positioned for supplying steam to the forward turbine 9 and will ensure that steam will be cut-off to the forward turbine when the operator's control lever is positioned for supplying steam to the reverse turbine.

The throttle adjusting motor selector valve portion 132 of the operator's control valve device comprises a forward selector valve device 187 for controlling communication between pipe 64 from the forward throttle adjusting motor 40 and a passage 188, and also comprises a reverse selector valve device 189 for controlling communication between said passage and pipe 65 leading to the reverse throttle adjusting motor 41, the passage 188 leading to a self-lapping speed control valve device 190 also forming a part of the operator's control valve device 129.

The forward selector valve device 187 comprises a plunger 191 which is slidably mounted in a suitable bore in the casing and which has at one side a chamber 192 connected to passage 188, and which has at its opposite side a chamber 193 which is open to atmosphere through a passage 194, a chamber 195, and an insect excluding device 196. The plunger 191 is connected by a stem 197 to a fluid pressure supply valve 198 which is contained in a chamber 199, said stem extending through an opening in a wall 200 separating said chambers. In chamber 199 the wall 200 is provided with a seat which extends around the opening therein for engagement by the supply valve 198. A spring 201 in chamber 199 acts on the valve 198 for urging the valve to its closed position as shown in the drawings.

The valve 198, stem 197 and plunger 191 are provided with an axial bore 202 open at one end to chamber 199 and at the opposite end to chamber 193. In chamber 193 the plunger 191 is provided with a seat which extends around the bore 202 for engagement by a release valve 203. Located above the release valve 203 is a plunger 204 which is slidably mounted in the casing in coaxial relation with said valve and with plunger 191. The plunger 204 is subject on its lower face to the pressure of fluid in chamber 193 plus the pressure of a spring 205, and is open at its upper face to chamber 206.

When fluid under pressure is supplied to chamber 206, in a manner which will be later described, the plunger 204 will move against the opposing force of spring 205 and seat the release valve 203 against the plunger 191 for closing communication between chamber 199 and chamber 193. Plunger 204 when further moved by fluid pressure in chamber 206 will act through the release valve 203 and plunger 191 to unseat the supply valve 198 so as to allow fluid under pressure to flow from chamber 192 to chamber 199 and thence through pipe 64 to diaphragm chamber 62 in the forward throttle adjusting motor 40. Upon release of fluid under pressure from chamber 206 the spring 205 will act to return plunger 204 to the position in which it is shown in the drawings to allow the closing of the supply valve 198 by spring 201 and the opening of the release valve 203 by the pressure of fluid effective in bore 202 so as to release fluid under pressure from chamber 62 in the forward throttle adjusting motor 40 past said release valve to atmosphere.

The reverse throttle selector valve device 189 is structurally identical to the forward throttle selector valve device 187 and briefly described, comprises a supply valve 207 for controlling flow of fluid under pressure from a chamber 208, which is open through chamber 192 to passage 188, to a chamber 209 which is connected to pipe 65 leading to diaphragm chamber 62 in the reverse throttle adjusting motor 41. The reverse throttle selector valve device further comprises a release valve 210 which is contained in chamber 195, and which is for the purpose of releasing fluid under pressure from the reverse throttle adjusting motor 41 by way of chamber 209. The device also comprises a plunger 211 which is arranged to operate in response to the supply of fluid under pressure to a chamber 212 to close the release valve 210 and open the supply valve 207. Upon the release of fluid pressure from chamber 212 a spring 213 will return the plunger 211 to the position in which it is shown in the drawings to permit the closing of the supply valve 207 by a spring 214 and the opening of the release valve 210 by the pressure of fluid from chamber 209, so as to thereby open pipe 65 and diaphragm chamber 62 in the reverse throttle adjusting motor 41 to atmosphere.

The plunger chamber 206 is connected to a passage 215, and the plunger chamber 212 is connected to a passage 216. The passages 215 and 216 lead respectively to forward and reverse directional control valve devices 217 and 218 in a direction selector portion 219 of the operator's control valve device 129.

The forward directional control valve device 217 comprises a plunger 220 which is slidably mounted in a bore in the casing and which is connected by a stem 221 to a supply valve 222 contained in a chamber 223. The stem 221 extends through a chamber 224 formed at one side of plunger 220 and also through a bore provided in a wall 225 which separates said chamber from chamber 223, said wall being provided around said bore in chamber 223, with a seat for engagement by the supply valve 222. A spring 226 in chamber 223 acts on the supply valve 222 for urging it to its seat. The supply valve 222, stem 221 and plunger 220 are provided with an axial bore open at one end to chamber 223 and open at the opposite end through a valve seat, to a chamber 227 which is open to atmosphere through a port 228. A release valve 229 contained in chamber 227 is provided to engage a seat on the end of plunger 220 for closing communication through the bore in said plunger. Chamber 224 is open to a passage 230 which is adapted to be constantly supplied with fluid under pressure from the fluid pressure supply pipe 180. Chamber 223 is connected to passage 215 leading to plunger chamber 206 in the forward throttle selector valve device 187. The release valve 229 is carried by a stem 231 which is slidably mounted in the casing and which extends beyond an exterior surface thereof.

The reverse directional control valve device 218 is structurally identical to the forward directional control valve device 217 and briefly described, comprises a supply valve 232 which is contained in a chamber 233 and which is arranged to be seated by the pressure of a spring 234. The supply valve is connected by a stem 235 which extends through a chamber 236 to a plunger 237 at the outer face of which plunger is a chamber 238 open to atmosphere through a port 239. A release valve 240 which is contained in chamber 238 is arranged to cooperate with a seat provided on the adjacent end of plunger 237 for controlling the release of fluid under pressure from chamber 233 to atmosphere by way of chamber 238. The release valve 240 has a stem 241 extending through a bore in the casing and beyond an exterior surface thereof. The chamber 236 is supplied with fluid under pressure from pipe 180 by way of passage 230 and chamber 224. Chamber 233 is connected to passage 216 leading to plunger chamber 212 in the reverse throttle selector valve device 189.

The two release valve stems 231 and 241 are arranged in spaced parallel relation with respect to each other and to the axis of the plunger 135 which is mounted to slide in rock shaft 134. The release valve stem 231 is engaged by one end of a lever 242 which, substantially midway between its ends, is fulcrumed on a pin 243 mounted in a bracket 244 projecting from the casing of the device. The opposite end of lever 242 is disposed in a recess 245 provided in plunger 135, so that longitudinal movement of said plunger will rock the lever 242 about the fulcrum pin 243. The release valve stem 241 is engaged by a lever 246 substantially midway of its length. One end of lever 246 is fulcrumed on a pin 247 provided in a bracket 248 projecting from the casing, while the opposite end is disposed in a recess 249 provided in the plunger 135 so as to move with the plunger upon longitudinal movement thereof.

With the operator's control lever 137 in "Neutral" position, as shown in Figs. 1 and 3 the levers 242 and 246 will be positioned to permit the opening of the release valves 229 and 240, respectively, and the closing of the supply valves 222 and 232, respectively, so as to thereby release fluid under pressure from plunger chambers 206 and 212 in the forward and reverse selector valve devices 187 and 189. The release valves 203 and 210 in the later devices will therefore be open and the supply valves 198 and 207 will be closed so that diaphragm chambers 62 in the forward and reverse throttle adjusting motors 40 and 41 will be opened to atmosphere. Thus with the operator's control lever in "Neutral" position the power piston chambers 53 in the forward and reverse throttle adjusting motors 40 and 41, will also be open to atmosphere to permit the power pistons 50 in said motors to occupy their steam cut-off positions as shown in Fig. 11 to thereby cut-off the supply of steam to the forward and reverse turbine 9 and 12, respectively.

The operator's control lever 137 when moved to the position designated by the legend "Forward selection" in Fig. 3, will move the plunger 135 longitudinally in the direction of the left-hand to thereby actuate the lever 242 to close the release valve 229 and open the supply valve 222 in the forward directional control valve device 217. Thus, in this position of the operator's control lever, fluid under pressure will be supplied from the supply pipe 180 to passage 215 and thence to plunger chamber 206 in the forward selector valve device 187 to thereby actuate said device to establish communication between passage 188 and pipe 64 leading to the forward throttle control motor 40. In this "Forward selection" position of the operator's control lever 137 it will be noted that the parts of the reverse directional control valve device 218 will remain in the position in which they are shown in Fig. 1 for opening plunger chamber 212 in the reverse selector valve device 189 to atmosphere, so that the later device will be conditioned to open pipe 65 and thereby diaphragm chamber 62 in the reverse throttle adjusting motor 41 to atmosphere in order that said motor will operate to cut-off the supply of steam to the reverse turbine 12.

The condition just described of the forward and reverse directional control valve devices 217 and 218 is obtained in the "Forward selection" position of the operator's control lever and is then maintained as long as said lever is at this side of "Neutral" position and consequently during the adjustment of the lever in the portion 142 of the lever guide slot.

Now if the operator's control lever 137 is moved from "Neutral" position to the position indicated by the legend "Reverse selection" in Fig. 3, the plunger 135 will be moved longitudinally in the direction of the right-hand as viewed in Fig. 1 and the lever as it is thus moved will actuate lever 246 to close the release valve 238 and open the supply valve 232 in the reverse directional control valve device 218, while allowing the parts of the forward directional control valve device 217 to remain in the position in which they are shown in Fig. 1. As a result, fluid under pressure will be supplied from passage 230 to passage 216 leading to plunger chamber 212 in the reverse selector valve device 189. The later device will then operate to open communication between pipe 188 and pipe 65 leading to diaphragm chamber 62 in the reverse throttle adjusting motor 41. Under this condition the parts of the forward selector valve device 187 will remain in the position in which they are shown in the drawings for opening pipe 64 and thereby diaphragm chamber 62 in the forward throttle adjusting motor 40 to atmosphere. This condition of the forward and reverse directional control valve devices 217 and 218 will be maintained as long as the operator's control lever is at the left-hand side of "Neutral" position, as viewed in Fig. 3, and therefore during adjustment of said lever in the portion 150 of the guide slot.

The self-lapping valve device 190 may be of any suitable type arranged to supply fluid at various degrees of pressure from a chosen minimum pressure to a certain maximum degree. For illustration, the self-lapping valve device 190 may be like that fully shown and described in my Patent 2,381,222 issued August 7, 1945, and briefly, comprises a control plunger 250 and valve means (not shown) controlled by said plunger and operable to provide in passage 188 fluid at a pressure proportional to the degree of displacement of said plunger from a normal position, such as shown in Fig. 1, and operable in the normal position to reduce the pressure in passage 188 to a chosen minimum pressure such as eight pounds. Fluid under pressure for supply to passage 188 by operation of the self-lapping control valve device is admitted to said device through passage 230 which is connected to the fluid pressure supply pipe 180 before mentioned. For controlling displacement of plunger 250 from its normal position as shown in Fig. 1, the rock shaft 134 is provided with a cam 251 having two identical but reversely arranged and spaced cam portions 252 and 253 on the peripheral surface of the cam. The peripheral surface of the cam is operatively connected to plunger 250 through a ball-like end 254 of an arm 255, the opposite end of which arm is mounted to rock about a fulcrum 256 provided in the casing.

With the operator's control lever 137 in "Neutral" position or in either of the "Forward" or "Reverse selection" positions, the cam 251 provides for movement of the plunger 250 to its outermost or normal position in which the self-lapping valve device 190 will operate to provide fluid at a minimum pressure of eight pounds to the control passage 188. Movement of the operator's control lever to either "Stop" position is adapted to cause operation of cam 251 to effect operation of the self-lapping valve device 190 to supply fluid at a certain greater pressure such as ten pounds to passage 188, which pressure, effective in diaphragm chamber 62 of the forward or reverse throttle adjusting motor 40 or 41 in a manner which will be later described, will actuate said motor and thereby the respective throttle valve 34 or 35 to supply the hereinbefore mentioned minimum amount of steam to the respective turbine 9 or 12.

The operator's control lever when moved in the portion 142 of the slot from the "Stop" position to the "Full steam" position will cause operation of cam 251 to effect displacement of plunger 250 into the self-lapping valve device 190 an amount proportional to the extent of movement away from "Stop" position to thereby provide in passage 188 fluid at a proportional pressure. A maximum pressure of fluid such as sixty-five pounds will be obtained in passage 188 upon movement of the operator's control lever in portion 142 of the slot to the "Full steam" position. Adjustment of the operator's control lever in the reverse direction in the portion 142 of the slot will cause the pressure in passage 188 to reduce in proportion to the distance the lever is out of the "Stop" position, while the return of said lever to the "Forward selection" position will cause operation of the self-lapping valve device to reduce the pressure of fluid in passage 188 to the minimum pressure above mentioned.

In a like manner the pressure of fluid in passage 188 will be varied in accordance with adjustment of the operator's control lever 137 in the portion 143 of the slot, as will be apparent.

Pressure chamber 28 in the pneumatic clutch control cylinder 22 is connected through pipe 29 to passage 216 in the operator's control valve device for control by operation of the reverse directional control valve device 218.

The operation of the apparatus as so far described will now be set forth.

Let it be initially assumed that the operator's control lever 137 is in "Neutral" postion effecting operation of the forward and reverse directional control valve devices 217 and 218 to open the plunger chambers 206 and 212 in the forward and reverse selector valve devices 187 and 189 to atmosphere. The forward and reverse selector valve devices 187 and 189 will thus be conditioned to open pipes 64 and 65 and diaphragm chambers 62 in the forward and reverse throttle adjusting motors 40 and 41 to the atmosphere to cause a complete release of fluid under pressure from the power piston chambers 53 therein. The power pistons 50 in the forward and reverse throttle adjusting motors will therefore be positioned as shown in Fig. 11, under the action of springs 58, so that, the throttle valves 34 and 35 are in position to cut-off the supply of steam to the forward and reverse turbines 9 and 12, so that the locomotive may be stopped.

Further, with the operator's control lever 137 in "Neutral" position the forward and reverse steam cut-off valve devices 165 and 166 will be conditioned as shown in Fig. 1 for supplying fluid under pressure from the supply pipe 180 to pipes 59 and 60 leading to spring chambers 56 and to the ensuring piston chamber 128 in the forward and reverse throttle adjusting motors 40 and 41, respectively, to ensure that the pistons 50 in said motors will be occupying their steam cut-off positions as shown in Fig. 11.

Moreover with the parts of the reverse directional control valve device 218 in the position as shown in Fig. 1, pressure chamber 28 in the clutch control cylinder 22 will be open to atmosphere by way of pipe 29 and passage 216 to permit operation of piston 23 by spring 30 to disengage the movable element 21 of the clutch from the fixed element 20 so as to disconnect the reverse turbine 12 from the forward turbine drive shaft 8.

Let it now be assumed that forward movement of the locomotive is desired. To accomplish this, the operator will move lever 137 from "Neutral" position first to the "Forward selection" position, to thereby actuate the forward directional control valve device 217 to supply fluid under pressure to passage 215 and thence to plunger chamber 206 to operate the forward selector valve device 187 to open communication between passage 188 from the self-lapping valve device 190 and pipe 64 leading to the forward throttle control motor 49.

The operator will then move the control lever 137 from the "Forward selection" position to the "Stop" position in the portion 142 of the slot. The lever as it is thus moved to "Stop" position will actuate the forward steam cut-off valve device 165 to release fluid under pressure from spring chamber 56 and the ensuring piston chamber 128 to permit closure of valve 120 in the forward throttle adjusting motor 40 and at the same time will actuate the self-lapping valve device 190 to supply fluid to passage 188 and through the forward selector valve device 187 to pipe 64 and thence to the diaphragm chamber 62 in the forward throttle control motor 40 at the pressure, such as ten pounds, sufficient to cause operation of said motor and thereby of the throttle valve 34 to supply steam to the forward turbine 9 in an amount insufficient to cause operation of the turbine but which will provide for heating thereof as hereinbefore described.

Movement of the lever 137 past "Stop" position in the direction of "Full steam" position in portion 142 of the slot will then cause operation of the self-lapping valve device 190 and thereby of the forward throttle adjusting motor 40 and throttle valve 34 to increase the supply of steam to the forward turbine 9 in an amount proportional to the extent of movement of the lever away from "Stop" position, to thereby cause operation of the forward turbine to drive the locomotive axle 1 and the locomotive at a proportional speed.

Further movement of the operator's control lever in the direction of "Full steam" position in the portion 142 of the slot will provide a corresponding increase in the amount of steam supplied to the forward turbine 9 and thereby a proportional increase in the speed of the locomotive while movement of said lever to "Full steam" position will cause operation of motor 40 and throttle valve 34 to provide a maximum amount of steam to the forward turbine 9 to obtain a maximum forward speed or output of power from the turbine for driving the locomotive in a forward direction.

If the operator should desire to reduce the speed of the locomotive he may move the control lever 137 in the direction of "Stop" position and the forward throttle adjusting motor 40 will operate to adjust the throttle valve 34 to correspondingly reduce the supply of steam to the forward turbine 9. Return of lever 137 to "Stop" position in the portion 142 of the slot will reduce the supply of steam to the forward turbine to the minimum amount which is insufficient for causing operation of the turbine as before mentioned.

It will thus be seen that by suitable adjustment of the operator's control lever in the portion 142 of the slot between the "Stop" and "Full steam" positions any desired degree of speed or output of power from the turbine 9 may be obtained for propelling the locomotive in a forward direction, it being noted that during this operation of the forward turbine 9, the reverse turbine 12 is maintained non-operative and disconnected from the locomotive axle since the parts of the reverse directional control valve device 218, reverse selector valve device 189, reverse steam cut-off valve device 166 and thereby the reverse throttle adjusting motor 41 remain in the positions in which they are shown in the drawings with the operator's control lever at the "Forward selection" side of "Neutral" position.

In order to provide for the stopping of the locomotive from movement in a forward direction, the operator need only return the lever to "Stop" position adjacent the "Forward selection" position to thereby render the forward turbine 9 non-operative, as will be apparent.

If the operator desires to move the locomotive in the reverse direction he will move the control lever 137 to the "Reverse selection" position for thereby operating the reverse directional control valve device 218 to supply fluid under pressure to passage 216 and thence to plunger chamber 212 in the reverse throttle selector valve device 189 for actuating the latter device to connect pipe 65 from the reverse throttle adjusting motor 41 to passage 188 leading to the speed control valve device 190. Fluid under pressure supplied to passage 216 will also flow through pipe 29 to the clutch control cylinder 22 to actuate piston 23 therein to move clutch element 21 into driving engagement with element 20 for connecting the reverse turbine 12 to drive shaft 8.

The operator may now move lever 137 from the "Reverse selection" position to "Stop" position in the portion 143 of the guide slot and this movement will effect operation of the reverse steam cut-off valve device 166 to open spring chamber 56 and piston chamber 128 to atmosphere and to permit closure of valve 120 in the reverse throttle adjusting motor 41 and at the same time will cause operation of the self-lapping valve device 190 to supply fluid to passage 188 and through the reverse selector valve device 189 to diaphragm chamber 62 in the reverse throttle adjusting motor 41 at a pressure to cause operation of said motor and thereby of the throttle valve 35 to supply steam to the reverse turbine 12 at a pressure insufficient to cause operation of said turbine but sufficient for heating same as before described. Suitable adjustment of lever 137 in the portion 143 of the slot between the "Stop" and "Full steam" positions will then cause operation of the reverse throttle adjusting motor 41 and thereby of the reverse throttle valve device 35 to cause operation of the reverse turbine 12 at any desired speed or degree of power output and the locomotive may be stopped upon return of the operator's lever to the "Stop" position for rendering the reverse turbine non-operative, as will be apparent from the previous description.

It is however desired to point out that with the operator's control lever at the "Reverse selection" side of "Neutral" position, the parts of the forward directional control valve device 217, the forward steam cut-off valve device 165, the forward selector valve device 187 and the forward throttle adjusting motor 40 will remain in the positions in which they are shown in the drawings rendering the forward turbine 9 non-operative during operation of the reverse turbine 12 to propel the locomotive in reverse. However, since the forward turbine 9 is at all times connected to the locomotive axle 1, its rotor (not shown) will turn as the locomotive is driven by the reverse turbine 12.

In pipe 64 leading to the forward throttle adjusting motor 40 is a choke 257 and a check valve 258 in a communication by-passing said choke, said check valve being so arranged as to render said choke effective to restrict the rate of flow of fluid under pressure to said motor for limiting, to a desired degree, the rate of acceleration of the locomotive in a forward direction. The communication containing check valve 258 permits a more rapid rate of release of fluid under pressure from the forward throttle adjusting motor to obtain a rapid cut-off of the supply of steam to the forward turbine 9. For the same reasons a choke 259 and by-pass communication containing a check valve 260 are provided in pipe 65 leading to the reverse throttle adjusting motor 41.

It is desired that the turbines 9 and 12 never be used for braking the locomotive. In other words, with the locomotive running backward steam must not be supplied to the forward turbine 9 which would tend to cause operation of said turbine to oppose movement of the locomotive. Likewise, with the locomotive moving forwardly, steam must not be supplied to the reverse turbine 12 at a time when said turbine would be connected to the locomotive axle.

In order to thus prevent the supply of steam to the reverse turbine 12 when the locomotive is moving forwardly, or to the forward turbine when the locomotive is moving rearwardly it is therefore essential to prevent movement of the operator's control lever 137 into the portion 143 of its guide slot under the former condition, or into the portion 142 of said slot under the latter condition but it is desired that under either of these conditions the lever be capable of movement to "Neutral" position.

For thus controlling movement of the operator's control lever 137, a pin 261, secured at one end in the body portion 129 of the operator's control device, projects upwardly into the cover 133, and pivotally mounted on the other end of this pin within said cover is a rockable and shiftable interlock member or stop 262. The member 262 has a slot 263 through which the pin 261 extends and which provides for movement of the member in a direction either toward or away from the operator's control lever 137. At one end of member 262 is a finger 264 which, with said member in the position in which it is shown in Fig. 8 and with the control lever 137 in its "Neutral" position, is movable past one side of said lever to a position for holding said lever against movement from "Neutral" position to the "Reverse selection" position and thus into portion 143 of the slot. With the member 262 shifted to the right on pin 261 (Fig. 8) an amount governed by the length of slot 263, the finger 264 will be so disposed as to move past the right-hand side of the operator's control lever 137 when in "Neutral" position to prevent movement of the operator's control lever to the "Forward selection" position and into the portion 142 of the slot. It will be noted that with the finger 264 disposed at the left-hand side of the operator's control lever 137 to block movement of said lever in the direction of the "Reverse selection" position, said lever may still be moved at will from "Neutral" position to the "Forward selection" position and into the forward control portion 142 of the slot, while with said finger disposed at the opposite side of the operator's control lever for blocking same against movement to the "Forward selection" position, said lever may still be moved at will, from "Neutral" position in the direction of the "Reverse selection" position.

A bell crank 265 is rockably mounted on a pin 266 disposed under the interlock member 262, and this crank has one arm 267, the end of which is disposed in a slot 268 provided in the end of the member opposite the finger 264. Rocking of the bell crank 265 will rock member 262 for moving the finger 264 in the direction toward or away from the path of movement of the operator's control lever 137. The bell crank 265 has another arm 269, and between the end of this arm and the body of the control device is interposed a spring 270 under pressure. This arm 269 is so arranged that spring 270 will urge the bell crank 265 in a direction to rock member 262 in a counter-clockwise direction, as viewed in Fig. 8, for moving the finger 264 into the path of movement of the operator's control lever 137. The bell crank 265 has a third arm 271 the end of which engages a plunger 272. The opposite end of plunger 272 terminates in a follower 273 engaging one side of a flexible diaphragm 274. The follower 273 is contained in a chamber 275 which is open to atmosphere through a vent 276. At the opposite side of diaphragm 274 is a pressure chamber 277 which is connected by a passage 278 (Figs. 1 and 7) to a pipe 279 leading to a timing reservoir 280 and to a zero speed or full stop detecting device 281. When fluid is provided through pipe 279 to chamber 277 below diaphragm 274 in a manner which will be later described, at a sufficient pressure to rock the bell crank 265 against the opposing pressure of spring 270, the interlock member 262 will move finger 264 out of the path of movement of the operator's control lever 137 while, when the pressure of fluid in said chamber is of a lower degree, spring 270 will act to operate said member to move finger 264 into the path of movement of the operator's control lever as before mentioned.

The zero speed detecting device 281 is adapted to be associated with any rotatable part of the locomotive which turns upon movement of the locomotive along its rails. In Fig. 2 the device is shown, for illustration only, associated with the locomotive drive axle 1.

The zero speed detecting device 281 comprises upper and lower casing sections 282 and 283 and a flexible diaphragm 284 which is clamped around its marginal edge between the adjacent ends of said casing sections. The opposite end of the casing section 283 has a bore lined with a bushing 285, the axis of said bushing being arranged in coaxial relation with said diaphragm and at right angles to the axis of the axle 1. Below the diaphragm 284 is a non-pressure chamber 286 containing a diaphragm follower 287 engaging the adjacent face of the diaphragm. At the opposite face of the diaphragm is a pressure chamber 288 containing a follower ring 289 engaging said opposite face. A plunger 290 slidably mounted in bushing 285 and extending into the non-pressure chamber 286 has a reduced portion 291 extending through the follower 287, the diaphragm 284 and follower ring 289 to a point beyond said ring, and mounted on this extended part is a nut 292 which contacts the ring 289 for clamping the diaphragm between said ring and follower 287.

The casing is provided with a stop shoulder 293 which is arranged to be engaged by follower 287 for limiting deflection of the diaphragm 284 in the direction of the locomotive axle 1. At the opposite side of the diaphragm is a stop shoulder 294 which is provided for contact with ring 289 to limit deflection of the diaphragm in the opposite direction to a normal position in which it is shown in the drawing. The contact between ring 289 and shoulder 294 is merely for stopping purposes and when such contact is effected, fluid under pressure may flow from one side of the shoulder 294 to the other so that chamber 288 constitutes space at both sides of said shoulder as indicated by the two lead lines from numeral 288.

A spring 295 encircling plunger 290 within the non-pressure chamber 286 bears at one end on the inner end of bushing 285, while the opposite end of said spring bears against the diaphragm follower 287. This spring is under pressure so as to urge the parts of the device to the position in which they are shown in the drawings and for opposing movement of said parts out of this position by pressure of fluid in chamber 288. It will be noted that chamber 288 is open through pipe 279 to chamber 277 below diaphragm 274 in the operator's control device, and it is desired to here point out that the pressure of spring 295 on diaphragm 284 will allow movement of said diaphragm by fluid in chamber 288 at a lower pressure than required to move diaphragm 274 against its opposing spring 270.

Below the lower casing section 283 the plunger 290 is cut away for about two-thirds of its diameter to provide at one side an arm 296 which terminates a certain distance above the locomotive axle 1. In the end of this arm is secured a fulcrum screw 297 arranged with its axle parallel to that of the locomotive axle 1, and pivotally mounted on this screw and thus carried by and movable with the arm 296 is a collapsible strut 298. Above the fulcrum screw 297 the strut 298 has an ear 299 to which is hooked one end of a tension spring 300, the opposite end of which spring is connected to a pin 301 secured in the plunger 290. The spring 300 is under tension so as to constantly bias the strut 298 in the direction toward the position in which it is shown in Figs. 12 and 13 and to oppose rocking movement of said strut on fulcrum pin 297 in either direction out of this position. The opposite end of the strut 298 is arcuate in form and secured thereto is a friction shoe 302 made of any suitable material, such as a brake lining, for contacting the locomotive axle 1. A guide pin 303 carried by plunger 290 extends into a slot 304 provided longitudinally of bushing 285, the pin cooperating with the bushing for maintaining the fulcrum pin 297 parallel to the locomotive axle 1.

The reduced portion 291 of plunger 290 is provided with a counter bore 305 open to the end disposed in chamber 288, and the nut 292 is provided with a bore through its end, which latter bore is of smaller diameter than bore 305 so as to provide a stop shoulder 306 overlying the open end of bore 305. A plunger 307 is mounted to slide through the opening in the end of nut 292 and is provided within bore 305 with an enlarged head 308 which is adapted to engage shoulder 306 for limiting movement of said plunger outwardly of bore 305. A coil spring 309 disposed in bore 305 bears at one end on the closed end wall of said bore, while its opposite end bears against the plunger head 308, the spring being provided for the purpose of urging the plunger outwardly through the nut 292, such outward movement being limited by contact between the head 308 and the shoulder 306 on said nut. On the opposite end of plunger 307 is a valve 310 which is arranged to cooperate with a seat provided on one end of a bushing 311. This bushing is secured in a bore in a wall 312 separating chamber 288 from a chamber 313 which is in constant communication with the atmosphere through an insect excluding device 314.

With the parts of the zero speed detecting device in the position as shown in Fig. 12, as defined by the contact between the follower ring 289 and stop shoulder 294, the valve 310 will be seated by spring 309, and the plunger head 308 will be spaced from stop shoulder 306 a distance greater than the distance between the locomotive axle 1 and friction shoe 302, so that, with the diaphragm 284 deflected in a direction away from stop shoulder 294 to a position in which the shoe 302 will just contact said axle, the valve 310 will be allowed to remain in contact with its seat under action of spring 309. If the axle 1 is rotating in either direction when the shoe 302 is moved into contact therewith, the friction between said shoe and axle will cause the strut 298 to rock on fulcrum pin 297 to a position in which one edge or the other of said strut will move past the axis of plunger 290, at which time pressure of fluid effective in chamber 288 on diaphragm 295, in a manner which will be later described, will cause said strut to rock on pin 297 to permit the diaphragm to move further in the direction of the axle and to the position defined by contact between follower 287 and stop shoulder 293. Upon this movement, the shoulder 306 on the nut 292 will engage the plunger head 308 and pull the valve 310 out of contact with its seat.

A control valve device 315 is provided for supplying fluid under pressure to and releasing fluid under pressure from pipe 279 and thus to and from the timing reservoir 280, diaphragm chamber 277 in the operator's control valve device, and chamber 288 in the zero speed detecting device 281.

The control valve device 315 comprises a casing having a chamber 316 constantly supplied with fluid under pressure from the fluid pressure supply pipe 180. The casing also has a chamber 317 containing a fluid pressure supply valve 318 arranged to control the supply of fluid under pressure from chamber 316 to chamber 317 and thence through a choke 319 to pipe 279 above mentioned. A communication including a check valve 320 by-passes the choke 319, said check valve being so arranged as to render said choke effective to restrict the rate of flow of fluid under pressure to pipe 279 but ineffective to limit outflow of fluid pressure from said pipe, the communication controlled by said check valve providing for a relatively greater rate of such outflow.

A plunger 321 is slidably mounted in a bore in the casing of the control valve device 315 in coaxial relation to the supply valve 318 said plunger being subject on one end to pressure of fluid in chamber 317. A sealing ring 322 disposed in an annular recess encircling the plunger 321 has sealing and sliding contact with the peripheral surface of said plunger to prevent leakage of fluid under pressure from chamber 317 past the plunger to a chamber 3223 which is open to atmosphere through a passage 324. The plunger 321 is operatively connected to one end of a diaphragm follower 325, the opposite end of which contacts the adjacent face of a flexible diaphragm 326 which is clamped around its marginal edge in the casing. The diaphragm 326 is subject on one side to atmospheric pressure in chamber 323 and at the opposite side there is provided a pressure chamber 327 which is connected through a pipe 328 to the side outlet of a double check valve device 329. The opposite ends of the double check valve device are respectively connected to passages 215 and 216 in the operator's control valve device. This double check device may be of any suitable structure adapted to operate upon the supply of fluid under pressure to passage 215, with passage 216 vented, in the manner before described, to open communication between passage 215 and pipe 328 and to close communication between said pipe and passage 216, while upon the supply of fluid to passage 216, with passage 215 vented, the double check valve will connect pipe 328 to passage 216 and disconnect said pipe from passage 215.

The plunger 321 is provided with an axial bore open through its lower end to chamber 317 and within this bore there is a valve seat and a release valve 330 arranged to cooperate with said seat for controlling communication between chamber 317 and the atmospheric chamber 323. This bore also contains a coil spring 331 which is under pressure and which acts on the release valve 330 for urging the valve to its seated or closed position as shown in the drawings. The release valve 330 has a fluted stem 332 which extends through the bore in the plunger in the direction of chamber 317 for contact with a stem 333 extending from the supply valve 318. A precompressed spring 334 is disposed in chamber 323. This spring encircles plunger 321 and two oppositely arranged spring seats 335 and 336 which are respectively engaged by the opposite ends of said spring. The spring seat 335 is connected to the plunger 321 by means of a suitable connecting member 337, while the spring seat 336 is provided at the end adjacent spring seat 335 with an inwardly extending collar 338 overlying a collar 339 on the plunger, but normally supported by the casing out of contact with said collar.

With chamber 327 open to atmosphere by way of either passage 215 or 216, the pressure of spring 334 will act to move the plunger 321 to the position in which it is shown in the drawing, which position is defined by contact between the diaphragm 326 and the casing. In this position the spring 331 is adapted to hold the release valve 330 seated and to position the stem 332 of said release valve so as to allow pressure of fluid effective in chamber 316 to open the supply valve 318 for permitting flow of fluid under pressure from said chamber to chamber 317. Upon supply of fluid to chamber 327 at a pressure sufficient to deflect the diaphragm 326 against the opposing pressure of spring 334 said diaphragm will act to move the plunger 321 in the direction of the supply valve 318 and such movement will be limited by contact between the spring seat 335 and a stop shoulder 340 provided in the casing. Upon such movement of plunger 321, the spring 331 will hold the release valve 330 seated until the supply valve 318 is closed and further movement of said plunger will then be relative to the release valve 330 which will be held against movement due to contact between stem 332 and stem 333 projecting from the supply valve 318. Thus this further movement will open the release valve 330 so as to release fluid under pressure from chamber 317 to atmosphere by way of passage 324.

In operation, let it be assumed that the operator's control lever 137 is in the portion 142 of the guide slot causing movement of the locomotive in a forward direction. The forward directional control valve device 217 will be conditioned to supply fluid under pressure to passage 215, while passage 216 will be open to the atmosphere through the reverse directional control valve device 218. The fluid pressure thus effective in passage 215 will also be effective through the double check valve device 329 in diaphragm chamber 327 of the control valve device 315, so that the diaphragm 326 will be deflected to the position for closing the supply valve 318 and opening the release valve 330. With the release valve 330 thus open pipe 279 and chamber 277 below the diaphragm 274 in the operator's control valve device will be open to atmosphere, as a result of which spring 270 will be effective to hold the bell crank 265 in the position in which it is shown in Fig. 7 and the interlock member 262 will be positioned as shown in Fig. 8 with the finger 264 disposed in the path of movement of the operator's control lever 137. With pipe 279 open to atmosphere as just mentioned, diaphragm chamber 288 in the zero speed detecting device 281 will also be open to atmosphere rendering spring 295 effective to hold the parts of said device in the position as shown in Fig. 12 with the strut 298 out of contact with the axle 1.

Now let it be assumed that, with the locomotive running in a forward direction as just mentioned, the operator desires to reverse the direction of movement of the locomotive. To accomplish this he will move the control lever 137 out of the portion 142 of the slot to the adjacent "Stop" position in order to cut off the supply of steam to the forward turbine 9 so that the locomotive may be brought to a stop. He will then continue movement of the lever 137 through the "Forward selection" position to "Neutral" wherein it will contact finger 264 of the interlock member 262 which will then prevent further movement of the lever to the opposite side of "Neutral" position. With the operator's control lever thus moved to "Neutral" position, the forward directional control valve device 217 will operate to release fluid under pressure from passage 215 and thereby from diaphragm chamber 327 in the control valve device 315. Spring 334 in the control valve device 315 will then move the diaphragm 326 to the position in which it is shown in Fig. 1, and as a result, the release valve 330 will be closed and the supply valve 318 will be permitted to open under the pressure of fluid effective in chamber 316. Fluid under pressure will now flow from chamber 316 to chamber 317 and thence through choke 319 to pipe 279 and through said pipe to diaphragm chamber 277 in the operator's control valve device and also to the timing reservoir 280 and to chamber 288 in the zero speed detecting device 281.

The pressure of fluid thus provided in chamber 288 on diaphragm 284 in the zero speed detecting device will then gradually increase at a rate determined by the flow capacity of choke 319 until it becomes sufficient to overcome the opposing force of spring 295 whereupon the diaphragm 284 will deflect downwardly or in the direction of the locomotive axle 1 out of the position in which it is shown in Fig. 12. After a slight degree of movement of the diaphragm 284 away from stop shoulder 294, the shoe 302 in the end of strut 298 will contact the locomotive axle 1. With the locomotive still moving in the forward direction, the rotation of axle 1 will then rock the strut 298 on its fulcrum pin 297 to a point where one end of the shoe 302 will move past the axis of plunger 290, whereupon the presssure of fluid effective in chamber 288 on the diaphragm 284 will promptly cause further movement of the diaphragm to the position defined by contact between the follower 287 and shoulder 293. The diaphragm 284 as it is thus further deflected will act, through the medium of the plunger 307 and plunger head 308, to unseat the valve 310, whereupon fluid under pressure will be released from chamber 288. The release capacity of the valve 310 so exceeds the supply capacity of choke 319 that when said valve is opened the pressure of fluid in chamber 288 will be suddenly reduced to a sufficiently low degree to permit spring 295 to promptly return the parts of the zero speed detecting device to the position as shown in Fig. 12, for closing valve 310, whereupon the strut 298 will be returned to the position in which it is shown in Figs. 12 and 13 by the spring 300.

When the valve 310 in the zero speed detecting device is closed as just described, the pressure of fluid in chamber 288 will again increase by the continued supply through choke 319 to a sufficient degree to again operate diaphragm 284 to move shoe 302 into contact with the axle 1. If the axle is still rotating the strut 298 will again collapse to permit the pressure of fluid in chamber 288 to operate the diaphragm 284 for again opening the valve 310 for releasing fluid under pressure from chamber 288.

The zero speed detecting device will continue to operate as just described as long as the axle 1 is turning in order to prevent the pressure of fluid increasing in diaphragm chamber 277 of the operator's control device sufficiently to overcome the opposing force of spring 270 on the bell crank 265. However, as soon as the locomotive comes to rest, at which time the axle 1 will cease rotating, the strut 298, when the diaphragm 284 is moved downwardly from the position in which it is shown in Figs. 12 and 13 by pressure of fluid in chamber 288, will merely move into contact with the axle and then support the diaphragm 284 against further movement so that the valve 310 will remain seated. When the valve 310 is thus held against opening, the pressure of fluid in chamber 288 and in chamber 277 in the operator's control valve device, will then increase to the higher or greater degree required to deflect diaphragm 274, against the opposing force of spring 270. This deflection of diaphragm 274 will rock the bell crank 265 and in turn the interlock member 262 in the direction for moving the finger 264 out of the path of movement of the operator's control lever 137. The lever 137 may then be moved from "Neutral" to its "Reverse selection" position and then into the portion 143 of its guide slot to cause operation of the reverse turbine 9 to move the locomotive in the reverse direction.

It will now be seen that the zero speed detecting device 281 and the interlock member 262 will prevent the operator from operating his control device to cause steam to be supplied to the reverse turbine 12 with the locomotive moving in a forward direction, so that said turbine cannot act in the capacity of a brake.

In case the engine is moving rearwardly and the operator desires that it move forwardly he will move the lever 137 from whatever position it may occupy at the left-hand side of "Neutral" position, as viewed in Fig. 3, back to "Neutral" position where it will be stopped by finger 264 of the lock member 262 for reasons which will be apparent from the above description. However, after the locomotive is brought to a complete stop from movement rearwardly, as detected by the zero speed detecting device 281, the finger 254 will be drawn out of the path of movement of lever 137 so that said lever may then be operated to cause steam to be supplied to the forward turbine 9 for moving the locomotive in a forward direction. Thus with the locomotive operating in a rearward direction, steam cannot be supplied to the forward turbine 9 until after the locomotive is brought to a complete stop, so that said turbine cannot act in the capacity of a brake.

It will be noted that the slots 263 and 268 in the interlock member 262 permit shifting of said member longitudinally in order to permit movement of the operator's control lever 137 to "Neutral" position from either side of "Neutral" position in order that the zero speed detecting device will be rendered operative for either direction of movement of the locomotive.

It will also be noted that if the locomotive is running either in the forward or in the reverse direction and the operator moves the control lever 137 to "Neutral" position, at which time the interlock finger 264 will act to prevent further movement of said lever, and the operator then desires to continue movement of the locomotive in the last direction of operation he may move the lever 137, without hesitation, back into the portion 142 or 143 of the slot last employed, since the interlock finger 264 has no control over such movement to continue running of the engine in the same direction.

In case the locomotive is stopped, and the operator's control lever is in "Neutral" position, the zero speed interlock device will be conditioned by contact of strut 298 with the locomotive axle 1 to permit such pressure increase in chamber 277 on diaphragm 274 of the operator's control valve device to move the interlock finger 264 out of the path of movement of the lever 137, so that without any delay the operator may move said lever in either direction from "Neutral" position to attain the desired direction of movement of the locomotive.

After the finger 264 is withdrawn from the path of movement of the operator's control lever 137 and said lever is moved out of "Neutral" position to cause reverse movement of the locomotive as above described, it should be noted that fluid under pressure is supplied to diaphragm chamber 327 in the control valve device 315 which will effect operation of said device to open the release valve 330 for venting fluid under pressure from the timing reservoir 280, chamber 288 in the zero speed detecting device and diaphragm chamber 277 the operator's control valve device, this venting occurring rapidly past the check valve 320. The parts of the zero speed detecting device will therefore return to the position in which they are shown in Fig. 12 and finger 264 will promptly move into the path of movement of lever 137 and then remain in this position as long as the locomotive is being propelled in the selected direction.

It will therefore be apparent that if the locomotive is started in one direction and the operator then suddenly decides to move the locomotive in the opposite direction, the finger 264 will be in the path of movement of lever 137 and prevent movement of said lever to the opposite side of "Neutral" position to obtain movement in the said opposite direction until after the locomotive is again brought to a stop.

When the locomotive is moving in the forward direction with the operator's control lever 137 out of "Neutral" position, the forward directional control valve device 217 will open communication between the fluid pressure supply pipe 180 and plunger chamber 206 in the forward selector valve device 187 so as to actuate said device for opening communication between the self-lapping speed control valve device 199 and diaphragm chamber 62 in the forward throttle adjusting motor 40, as previously described. It will thus be seen that in case of loss of fluid under pressure from pipe 180, the forward selector valve device 187 will automatically operate to close communication between the speed control valve device 190 and the forward throttle adjusting motor 40 and to release fluid under pressure from chamber 62 in said motor for causing operation of said motor to cut off the supply of steam to the forward turbine. The same is true in case the operator's control lever 137 is out of "Neutral" position in the direction for supplying fluid under pressure to the reverse throttle adjusting motor 41 for causing movement of the locomotive in the reverse direction. Thus, regardless of the direction of movement of the locomotive, failure of the supply of fluid under pressure to the fluid pressure supply pipe 180 will automatically effect the cutting off of the supply of steam to the respective turbine 9 or 12.

The supply of fluid under pressure to pipe 180 is obtained from the main reservoir 88 through pipe 87, a suitable reducing valve device 341, pipe 342, a lubricant pressure interlock valve device 343 and speed limiting means comprising a cut-off valve device 344 and forward and reverse speed limiting valve devices 345 and 346, respectively, which are provided for controlling operation of said cut-off valve device.

The interlock valve device 343 comprises a plunger 347 which is slidably mounted in a suitable casing and also comprises a ring seal 348 which is disposed in a recess encircling said plunger and having sealing and sliding contact therewith for preventing leakage of fluid under pressure from a chamber 349 at one end of said plunger to a chamber 350 at the opposite end, the chamber 350 being open to atmosphere through a port 351. The plunger 347 is connected by a stem 352 to a fluid pressure supply valve 353 contained in a chamber 354 to which the fluid pressure supply pipe 180 is connected. The stem 352 extends through an opening in a wall 355 which is provided with a seat for engagement by the supply valve 353 to close communication through said opening between chamber 354 and chamber 349. A spring 356 in chamber 354 acts on the supply valve 353 for urging it into contact with its seat. The supply valve 353, stem 352 and plunger 347 are provided with a bore open at one end to chamber 354 and open at the opposite end through a seat to chamber 350 which contains a release valve 357 arranged to cooperate with said seat for closing communication between chambers 354 and 350.

The interlock valve device 343 further comprises a flexible diaphragm 358 clamped around its marginal edge in the casing in coaxial relation with the release valve 357 and supply valve 353. At the side of diaphragm 358 adjacent the release valve 357 is a non-pressure chamber 359 containing a follower 360 having one side engaging the diaphragm. At the opposite side of follower 360 is an annular stop 361 arranged to be engaged by said follower for limiting movement thereof and deflection of the diaphragm 358 in one direction. At the opposite side of diaphragm 358 is a pressure chamber 362 into which extends a stop 363 arranged to be engaged by said diaphragm for limiting movement thereof in the opposite direction.

The follower 360 has a stem 364 slidably mounted in a bore provided through an adjusting nut 365, and the end of this stem is connected to the end of a stem 366 projecting from the release valve 357. A precompressed spring 367 encircling follower stem 364 bears at one end on the nut 365 while the opposite end bears against the follower 360 for urging said follower and the diaphragm 358 in the direction of stop 363. The pressure of this spring on the follower and on the diaphragm is adjusted by the regulating nut 365.

The pressure chamber 362 is connected to the discharge pipe 45 of the constant speed lubricant pump 43 driven by turbine 42 so that the diaphragm 358 will be constantly subject in chamber 362 to the pressure of lubricant delivered by said pump. Assuming that the pump 43 operates to maintain the intended substantially constant pressure of lubricant in pipe 45 of for instance 35 lbs., this pressure, effective in chamber 362 on diaphragm 358 will overcome the opposing force of spring 367, and hold said diaphragm in the position in which it is shown in the drawings for seating the release valve 357 on plunger 347 and for shifting said plunger to open the supply valve 353 for thereby opening communication between the fluid pressure supply pipe 180 and a passage 368 leading to the cut-off valve device 344.

The spring 367 may be adjusted to move the diaphragm 358 against the opposing pressure of lubricant in chamber 362 if the pressure of such lubricant becomes reduced to a chosen low degree such as 10 lbs., under which condition the diaphragm 358 will be moved by spring 367 into contact with stop 363 to permit closing of valve 353 by spring 356 and opening of the release valve 367 by pressure of fluid from pipe 180. With the release valve 357 open, fluid under pressure will be released from the fluid pressure supply pipe 180. Thus, if, while the locomotive is in motion, the pressure of lubricant delivered by the pump 43 for lubricating different parts of the locomotive and turbines should become reduced to the undesirably low degree above mentioned, the interlock valve device 343 will automatically operate to release fluid under pressure from pipe 180 and thereby cause release of fluid under pressure from diaphragm chamber 62 in the forward or reverse throttle adjusting motor 40 or 41, whichever is effective, so as to cut off the supply of steam to the effective turbine 9 or 12 of the locomotive to provide for stopping of the locomotive.

Moreover it will be noted that in case the pump 43 fails to provide sufficient pressure in pipe 45 for actuating the interlock valve device 343 to open the supply valve 353 therein, with the locomotive at a standstill, the fluid pressure supply pipe 180 will be maintained open to atmosphere so that the operator will be unable to supply steam to either turbine to cause movement of the locomotive.

The cut-off valve device 344 comprises a casing having a chamber 369 which is arranged to be supplied with fluid under pressure from the reducing valve device 341 through pipe 342. The casing also has a chamber 370 containing a fluid pressure supply valve 371 for controlling communication between chamber 369 and chamber 370 and thus between the fluid pressure supply pipe 342 from the reducing valve device 341 and passage 368 which opens to chamber 370. The casing further comprises a plunger 372 slidably mounted in the casing and subject on one side to pressure of fluid in chamber 370 and on the opposite side to pressure of fluid in a chamber 373 which is open to atmosphere through a passage 374. A sealing ring 375 is disposed in a groove in the casing provided around plunger 372 has sealing and sliding contact with said plunger to prevent leakage of fluid under pressure from chamber 370 to chamber 373. In chamber 373 one end of plunger 372 is connected to a follower 376 which contacts one face of a flexible diaphragm 377 which is clamped around its marginal edge in the casing. One side of this diaphragm is subject to atmospheric pressure in chamber 373 while at the opposite side is a pressure chamber 378 which is open to a control passage 379.

The plunger 372 is provided with a bore open at one end to chamber 370 and has an internal valve seat for engagement by a release valve 380 contained in said bore for controlling communication between chamber 370 and chamber 373. This bore also contains a coil spring 381 acting on the release valve 380 for urging it to its seated position as shown. The release valve 380 has a fluted stem 382 extending through the bore in the plunger in the direction of chamber 370 and arranged for contact by a stem 383 projecting from the supply valve 371. In chamber 373 a coil spring 384 encircles the plunger 372. One end of spring 384 bears against a seat 385 which is secured for movement with the stem by a member 386. The opposite end of the spring is supported on a seat 387 normally supported on the casing and having a flange 388 arranged to interlock with a collar 389 on the plunger.

Due to the connections between spring 384 and plunger 372 through the seat 385 and due also to the fact that said spring is precompressed between the two seats, said spring exerts a certain pressure against the diaphragm 377 for urging same to the position in which it is shown in the drawings. With the diaphragm 377 in this position, the release valve 380 will be closed by spring 381 while the supply valve 371 may be opened by pressure of fluid from pipe 342 so that fluid from said pipe will flow to chamber 370 and thence through passage 368 to chamber 349 in the lubricant interlock valve device 343.

With the parts of the interlock valve device 343 positioned as shown in the drawing when the pressure of lubricant delivered by pump 43 exceeds the chosen low degree, fluid supplied to passage 368 will be supplied to the fluid pressure supply pipe 180. However, when fluid is supplied to diaphragm chamber 378, as will be later described, at a pressure exceeding the opposing force of spring 384, diaphragm 377 will deflect downwardly to a position defined by contact between spring seat 385 and a stop shoulder 389 in the casing. This movement of diaphragm 377 and thereby of follower 376 will act through spring 381 and release valve 380 to move the supply valve 371 into contact with its seat for cutting off the supply of fluid under pressure from the supply pipe 342 to passage 368 and thence to the fluid pressure supply pipe 180. After the supply valve 371 is closed, continued movement of diaphragm 377 will move plunger 372 relative to the release valve 380 which at this time will be held against movement by the seated supply valve 371, thereby opening said release valve. When the release valve is thus opened, passage 368 will be connected to atmosphere so as to release fluid under pressure from the fluid pressure supply pipe 180.

The passage 379 leads to the side outlet of a double check valve 390 the opposite ends of which are open to passages 391 and 392 leading to the forward and reverse speed limiting valve devices 345 and 346, respectively.

The forward speed limiting valve device 345 comprises a casing having a chamber 393 connected to the fluid pressure supply pipe 342 and containing a fluid pressure supply valve 394 having a fluted stem extending through a bore in a wall separating said chamber from a chamber 395 to which passage 391 is connected. On the end of the supply valve stem disposed in chamber 395 is formed a release valve 396. A plunger 397 slidably mounted in a bore in the casing extends into chamber 395 in coaxial relation with the release valve 396 and is provided on its end with a seat for said valve. The plunger 397 has an axial passage 398 extending through the seat for the release valve 396 and also opening to a chamber 399 which is open to atmosphere as by way of a passage 400. In chamber 399 is a spring 401 acting on the plunger 397 for urging same in a direction out of seating contact with the release valve 396. A sealing ring 402 disposed in a recess in the casing encircling plunger 397 has sealing, sliding contact therewith to prevent leakage of fluid under pressure from chamber 395 to chamber 399.

The forward speed limiting device further comprises a flexible diaphragm 403 disposed in coaxial relation to plunger 397 and clamped in the casing around its marginal edge. The diaphragm 403 has at one side a non-pressure chamber 404 containing a follower 405 engaging the diaphragm. The follower 405 has a stem 406 mounted to slide in a bore provided centrally through an adjusting nut 407 having screw-threaded contact with the casing. An adjusting screw 408 is secured in the end of stem 406 for contact with the end of plunger 397. Encircling stem 406 within chamber 404 is a coil spring 409. One end of this spring is supported on the adjusting nut 407 while the opposite end bears against the follower 405. This spring is placed under a chosen degree of pressure by regulation of nut 407 for urging the diaphragm into contact with a stop 410.

With diaphragm 403 in contact with stop 410 spring 401 will move plunger 397 out of sealing engagement with the release valve 396 and the supply valve 394 will be seated by a spring 411. Movement of diaphragm 403 out of contact with stop 410 to a position defined by contact of follower 405 with a stop 412 will move plunger 397 into seating engagement with release valve 396 and will then act through said release valve to open the supply valve 394.

At the opposite side of diaphragm 403 is a pressure chamber 413 which is connected to pipe 47 leading to the outlet of the impeller pump 46 which is arranged to be driven by the forward steam turbine 9. When the locomotive is in use, the pressure of lubricant provided through pipe 45 at the inlet to pump 46 will be maintained constant. With the locomotive operating in a forward direction the pump 46 will then deliver to pipe 47 and chamber 413 in the forward speed limiting valve device 345 lubricant at a pressure which will vary in proportion to the speed at which the locomotive is operated. In the forward speed limiting valve device 345, the pressure of spring 409 against the diaphragm 403 is so adjusted as to maintain the diaphragm in the position in which it is shown in the drawing against the opposing pressure of lubricant provided in chamber 413 up to a chosen maximum forward speed of the locomotive which may for example be 85 M. P. H. Thus when the locomotive is operating in a forward direction at a speed below 85 M. P. H. diaphragm chamber 378 of the cut-off valve device 344 will be open to atmosphere past the open release valve 396 in the forward speed limiting valve device 345, permitting said cut-off valve device to operate to supply fluid under pressure from the supply pipe 342 to passage 180. However, in case the forward speed of the locomotive is increased to the high speed limit of 85 M. P. H., the pressure of lubricant provided by pump 46 in diaphragm chamber 413 will move diaphragm 403 and thereby the follower 405 to their lower positions for closing the release valve 396 and opening the supply valve 394. When the supply valve 394 is thus opened, fluid under pressure will flow through passage 391 and past the double check valve 390 to chamber 378 of the cut-off valve device 344. The cut-off valve device will then operate to cut off the supply of fluid under pressure to passage 368 and open said passage and thereby the fluid pressure supply pipe 180 to the atmosphere. With passage 180 thus opened to the atmosphere, the fluid pressure will be released from pipe 64 and thereby from the forward throttle adjusting motor 40 causing operation thereof to cut off the supply of steam to the forward turbine 9 so as to prevent the locomotive operating at a higher speed.

After the steam to the forward turbine has been cut off as just described, the locomotive may decelerate and when the speed becomes reduced to a degree below the 85 M. P. H. limit the parts of the forward speed limiting valve device 345 will return to the position in which they are shown in the drawings to cause operation of the cut-off valve device 344 to again open communication between the fluid pressure supply pipe 342 and passage 368 so that fluid under pressure will again be supplied to the fluid pressure supply pipe 180. The forward throttle adjusting motor 40 may then again be operated to resupply steam to the forward turbine for driving the locomotive forward.

The reverse speed limiting valve device 346 is structurally identical to the forward speed limiting valve device 345, and briefly, comprises a supply valve 414 contained in chamber 393 for controlling flow of fluid under pressure from said chamber to a chamber 415 to which passage 392 is open. A release valve 416 in chamber 415 is arranged to cooperate with a seat provided on the end of a plunger 417 for controlling communication between said chamber and a chamber 418 which is open to atmosphere through a passage 419. A spring 420 in chamber 393 acts on the supply valve 414 for urging it to its closed position, while a spring 421 in chamber 418 acts on plunger 417 for urging it out of seating engagement with the release valve 416. The device further comprises a flexible diaphragm 422 having at one side a chamber 423 connected to pipe 49 leading to the outlet of the impeller pump 48 which is connected for operation by the reverse turbine 12. At the opposite side of diaphragm 422 is a non-pressure chamber 424 containing a diaphragm follower 425 contacting the diaphragm 422 and having a stem 426 freely extending through a bore in an adjusting nut 427 and connected to the end of plunger 417. A coil spring 428 encircling stem 426 is supported at one end on the adjusting nut 427 while the opposite end bears against the follower 425. This spring is under pressure determined by the adjustment of nut 427.

The pressure chamber 423 being connected to the outlet of the impeller pump 48, said pump upon operation of the locomotive rearwardly will provide fluid in said chamber at a pressure proportional to the speed of such movement. The pressure of spring 428 is so adjusted as to hold the follower 425 and diaphragm 422 in the position in which they are shown in the drawings against the pressure provided in chamber 423 by pump 48 at all rearward speeds of the locomotive up to a chosen maximum speed, such as 65 M. P. H. and when this speed is obtained the pressure provided in said chamber will deflect the diaphragm 422 against spring 428 and close the release valve 416 and open the supply valve 414. When the supply valve 414 is opened, fluid under pressure will flow from pipe 342 to passage 392 and thence past the lower end of the double check valve 390 to passage 379 and to chamber 378 in the cut-off valve device 344 which will cause operation of said cut-off valve device to cut off the supply of fluid under pressure to the fluid pressure supply pipe 180 leading to the operator's control valve device and to open said pipe to atmosphere. Upon opening pipe 180 to atmosphere the fluid from pipe 65 and chamber 62 in the reverse throttle adjusting motor 41 will be vented, so that said motor will operate to cut off the supply of steam to the reverse turbine 12 and prevent any further increase in the speed of the locomotive. When the locomotive speed is then reduced to below the 65 M. P. H. limit, the reduction in pressure in chamber 423 will permit operation of the reverse speed limiting valve device 346 to cause a resupply of steam to the reverse turbine 12, as will be apparent.

It will now be seen that the forward speed limiting valve device 345 will operate to limit the rate of forward movement of the locomotive to a certain maximum speed, while the reverse speed limiting valve device 346 will operate to limit the rate of rearward movement to a certain maximum speed which may be different than the forward speed limit, said limits being chosen by adjustment of regulating nuts 407 and 427. The two separate and independently operating speed limiting devices 345 and 346 are required only to provide the different speed limits for forward and rearward operation of the locomotive. Otherwise one of these devices could be dispensed with.

It will now be noted that the supply of fluid under pressure to pipe 180 from the reducing valve device 341 is controlled jointly by the cut-off valve device 344 and by the lubricant interlock valve device 343 and operation of the former in response to overspeed of the locomotive in either direction of operation will cut off the supply of fluid under pressure to pipe 180 and release the fluid under pressure therefrom the same as occurs upon operation of the lubricant pressure interlock valve device 343 in case the pressure of lubricant supplied to the bearings of the turbines and of other parts of the locomotive becomes reduced to an undesirably low degree. Further in connection with the speed limiting valve devices 345 and 346 it will be noted that these devices will act in case of the locomotive wheels slipping on the rails to limit the speed of wheel spin and prevent undue racing of the driving turbine in the same manner as occurs if the actual rail speed of the locomotive tends to exceed the high speed limits, as above described.

In addition to the above described apparatus the control system further comprises a low pressure alarm device 429 which comprises a casing having a chamber 430 connected to the main reservoir fluid pressure supply pipe 87 and containing a supply valve 431 for controlling flow of fluid under pressure from said chamber to a chamber 432 which is open to a timing reservoir 433. A plunger 434 is slidably mounted in the casing in coaxial relation with the supply valve 431 and one end of this plunger is subject to pressure of fluid in a chamber 435 which is connected by a pipe 436 to an operator's warning whistle 437. The plunger 434 has a bore open through one end to chamber 432 which contains a fluid pressure release valve 438 arranged to cooperate with a seat on the end of said plunger for controlling communication between chamber 432 and chamber 435. A spring 439 disposed in the bore end plunger 434 acts on the release valve 438 for urging it out of contact with its seat.

The supply valve 431 is operatively connected to the release valve 438 by means of a stem 440, and a spring 441 in chamber 430 acts on the supply valve for urging it to its seated position. The opposite end of plunger 434 is in the form of a stem 442 which slidably extends through a bore in a barrier 443 into a chamber 444, said barrier separating the latter chamber from chamber 435.

Chamber 444 is open to atmosphere through a port 445 and contains a follower 446 connected to the stem 442 and engaging one side of a flexible diaphragm 447 which is clamped around its marginal edge in the casing. At the opposite side of diaphragm 447 is a chamber 448 connected to pipe 45 and thus is at all times filled with lubricant at the pressure delivered by the constant pressure lubricating pump 43. The plunger 434 is encircled by a coil spring 449 one end of which is supported on a seat 450 carried by the casing, while the opposite end of said spring bears against a seat 451 which is secured to the plunger by securing means 452.

The pressure of spring 449 on diaphragm 447 is such that when the opposing pressure of lubricant delivered by the pump 43 and effective in chamber 448 on the diaphragm 447 exceeds a certain degree, such as twenty pounds per square inch, the lubricant pressure will deflect the diaphragm 447 to the position in which it is shown in the drawings for closing the release valve 438 and for opening the supply valve 431. With the supply valve 431 open, fluid under pressure from the main reservoir pipe 87 will flow to and equalize in the timing reservoir 433.

If for any reason the pressure of lubricant delivered by pump 43 should become reduced to a degree less than the twenty pounds, spring 449 will move the diaphragm 447 and plunger 434 upwardly to a position defined by contact with a stop 453 and upon such movement, spring 441 will close valve 431 and said plunger will move out of sealing engagement with the valve 438, the spring 439 holding the latter valve against movement after the seating of valve 431. Fluid under pressure from the timing reservoir 433 will then flow past valve 438 to chamber 435 and thence through pipe 436 to the whistle 437 and cause said whistle to produce a signal to warn the operator of the low pressure in the lubricating system of the locomotive. The whistle 437 will act to restrict release of fluid under pressure from chamber 435 so that a certain pressure will at this time be effective in said chamber. It is desired that the side of diaphragm 447 open to chamber 444 be subjected to atmospheric pressure, and the barrier 443 is provided to prevent the pressure attained in chamber 435 being effective on the adjacent face of said diaphragm.

It is preferred that the low pressure alarm device 429 operate to cause blowing of whistle 437 at a pressure in the lubricating pipe 45 greater than that at which the lubricant interlock valve device 343 operates to cut off the supply of fluid under pressure to the fluid pressure supply pipe 180 in order that the operator may be appraised of the low pressure condition of lubricant before it becomes reduced to the lower degree which will cause operation of the interlock valve device 343 to cut off the supply of steam to the effective turbine 7 or 12.

*Summary*

It will now be seen that the improved control apparatus provides for selective control of the direction of movement of a prime mover such as a steam driven locomotive in either a forward direction or in the reverse direction as determined by the supply of steam to either the forward turbine or the reverse turbine. The supply of steam to the two turbines is selectively controlled by a manually movable lever and means are provided for preventing the supply of steam to either turbine when the locomotive is moving in a direction opposite that which the turbine would drive the locomotive. In other words, the locomotive must be brought to a complete stop before steam can be supplied to the turbine for driving the locomotive in the opposite direction, means being provided to determine when a complete stop is obtained and to automatically prevent operation of the operator's control device to supply steam to said turbine until after said stop condition has been obtained.

The control apparatus employs fluid under pressure or compressed air as a controlling medium and the supply of this fluid under pressure for controlling purposes is controlled by a device responsive to pressure of lubricant in the locomotive lubricating system so as to automatically prevent operation of the locomotive, or to cut off the supply of steam to the operating turbine if the locomotive is operating, in case the pressure of lubricant is or becomes reduced to less than a certain degree.

The supply of fluid under pressure for controlling the steam supply to the turbines is also controlled by forward and reverse speed limiting valve devices which are controlled by speed limiting means for cutting-off the supply of controlling fluid to the operator's control device and for thereby cutting off the supply of steam to the operating turbine in case the speed of the locomotive or of the driving turbine tends to exceed certain maximum limits. The control apparatus also embodies a low pressure alarm arrangement which is operable automatically in case the pressure of lubricant in the lubricating system becomes reduced to a chosen low degree to warn the operator of the dangerous condition and this warning is preferably provided for before operation of the low pressure lubricant interlock device to cut off the supply of steam to the operating steam turbine.

Having now described my invention, what I claim as new and desire to secure by Letters Patent, is:

1. An apparatus for selectively controlling two prime movers, comprising in combination, a first fluid pressure adjutable means for one of said prime movers, a second fluid pressure adjustable means for the other prime mover, a fluid pressure regulating device operable to regulate the pressure of fluid in said first and second adjustable means, selector means operable to connect either one of said adjustable means to said regulating device for control thereby and to at the same time disconnect the other adjusting means from said regulating device, and an operator's control lever operable to control operation of said selector means and regulating device.

2. An apparatus for selectively controlling two prime movers, comprising in combination, a first fluid pressure adjustable means for one of said prime movers, a second fluid pressure adjustable means for the other prime mover, a fluid pressure regulating device operable to regulate the pressure of fluid in said first and second adjustable means, selector means for connecting either one of said adjustable means to said regulating device for control thereby and to at the same time disconnect the other adjustable means from said regulating device, an operator's control lever having a neutral position and operable upon movement in one direction from neutral position to effect operation of said selector means to connect one of said adjustable means to said regulating device and operable upon movement in the opposite direction from neutral position to effect operation of said selector means to connect the other adjusting means to said regulating device, and means operable by said lever, after operation of said selector means, to effect operation of said regulating device.

3. An apparatus for controlling the starting, stopping and speed or power output of two prime movers comprising in combination, a fluid motor for each prime mover adjustable by fluid under pressure to start and effect operation of said prime mover at a speed proportional to the pressure of such fluid and operable upon the release of such fluid pressure to provide for stopping of said prime mover, a self-lapping valve device operable to provide fluid under pressure for controlling both of said fluid motors, an operator's control lever, valve means controlled by said lever operable upon a limited movement of said lever in one direction to connect one of said motors to said valve device for control thereby while maintaining the other motor disconnected from said valve device and being operable upon a limited movement in the opposite direction to connect the said other motor to said valve device for control thereby while maintaining the said one motor disconnected from said valve device, and means controlled by said lever operable upon greater movement of said lever in either direction to effect operation of said valve device to supply fluid to the connected motor at a pressure proportional to the extent of such greater movement and being operable during said limited movement in either direction to release all fluid supplied by said valve device.

4. An apparatus for controlling the starting, stopping and speed or power output of two prime movers comprising in combination, a fluid motor for each prime mover adjustable by fluid under pressure to start and effect operation of said prime mover at a speed proportional to the pressure of such fluid and operable upon the release of such fluid pressure to provide for stopping of said prime mover, a self-lapping valve device operable to provide fluid under pressure for controlling both of said fluid motors, an operator's control lever having a neutral position, first and second positions at opposite sides, respectively, of said neutral position, and being movable beyond said first and second positions away from said neutral position for effecting operation of said valve device to supply fluid at a pressure proportional to the extent of such movement, and valve means controlled by said lever operable in neutral position thereof to disconnect both of said fluid motors from said valve device and to release fluid under pressure from said motors, said valve means being operable by said lever in said first position to connect one of said motors for control to said valve device while maintaining the fluid pressure released from the other motor and being operative by said lever in said second position to connect said other motor for control to said valve device while maintaining the fluid pressure released from said one motor.

5. An apparatus for controlling the starting, stopping and speed or power output of a prime mover comprising in combination, a fluid motor operable upon supply of fluid under pressure to one chamber and release of fluid under pressure from a second chamber to effect starting and operation of said prime mover at a speed proportional to the pressure of fluid in said one chamber, and operable upon release of fluid under pressure from said one chamber and supply of fluid under pressure to said second chamber to provide for stopping of said prime mover, a self-lapping fluid pressure regulating device operable to regulate the pressure of fluid in said one chamber, supply and release valve means operable to supply fluid under pressure to and release fluid under pressure from said second chamber, an operator's control lever, and means operable by said lever upon movement thereof to one position to effect operation of said regulating device to release fluid under pressure from said one chamber and to also effect operation of said valve means to supply fluid under pressure to said second chamber and operable upon movement of said lever out of said one position to effect operation of said valve means to release fluid under pressure from said second chamber and to also effect operation of said regulating device to supply fluid to said first chamber at a pressure proportional to the extent of movement from said one position.

6. An apparatus for controlling the starting, stopping and speed or power output of a prime mover comprising in combination, a fluid motor comprising a piston operable upon supply of fluid under pressure to a control chamber to start and operate said prime mover at a speed proportional to the pressure of such fluid, spring means acting on said piston operable upon opening said control chamber to atmosphere to provide for stopping of said prime mover, said piston being also operable to provide for stopping of said prime mover upon supply of fluid under pressure to a second chamber with fluid under pressure released from said control chamber, an operator's control device comprising a lever and self-lapping valve means operable upon movement of said lever out of a certain position to supply fluid to said control chamber at a pressure proportional to the extent of such movement and operable in said certain position to open said control chamber to atmosphere, and valve means controlled by said lever operable in said certain position of said lever to supply fluid under pressure to said second chamber and operable upon movement out of said certain position to release fluid under pressure from said second chamber.

7. An apparatus for controlling the starting, stopping and speed or power output of either of two prime movers comprising in combination, a fluid controlled motor for each prime mover comprising a piston operable upon supply of fluid under pressure to a control chamber and release of fluid under pressure from a second chamber to start and operate said prime mover at a speed proportional to the pressure of fluid in said control chamber, spring means acting on said piston operable upon release of fluid under pressure from said control chamber to effect operation of said piston to provide for stopping of said prime mover, said piston being also operable to provide for stopping of said prime mover upon supply of fluid under pressure to said second chamber with fluid under pressure released from said one chamber, an operator's control device comprising a lever having a neutral position, means controlled by said lever operable upon movement out of said neutral position in one direction to effect a supply of fluid under pressure to said control chamber and a release of fluid under pressure from said second chamber in one of said motors and at the same time effect a release of fluid under pressure from said control chamber and a supply of fluid under pressure to said second chamber in the other motor, and operable upon movement of said lever from neutral position in the opposite direction to effect a supply of fluid under pressure to said control chamber and a release of fluid under pressure from said second chamber in the said other motor and at the same time effect a release of fluid under pressure from said control chamber and a supply of fluid under pressure to said second chamber in said one motor.

8. An apparatus for controlling the starting, stopping and speed or power output of either of two prime movers comprising in combination, a fluid controlled motor for each prime mover comprising a piston operable upon supply of fluid under pressure to a control chamber and release of fluid under pressure from a second chamber to start and operate said prime mover at a speed proportional to the pressure of fluid in said control chamber, spring means acting on said piston operable upon release of fluid under pressure from said control chamber to effect operation of said piston to provide for stopping of said prime mover, said piston being also operable to provide for stopping of said prime mover upon supply of fluid under pressure to a second chamber with fluid under pressure released from said one chamber, an operator's control device comprising a lever having a neutral position and being movable in either one direction from neutral position or in the opposite direction from neutral position, separate valve means for controlling the pressure of fluid in each of said control chambers, said control device being operable with said lever in neutral position to effect operation of both said valve means to open the respective control chambers to atmosphere and being operable upon movement out of neutral position in said one direction to effect operation of one of said valve means to supply fluid under pressure to the respective control chamber and to effect operation of the other valve means to maintain the respective control chamber open to atmosphere, and being operable upon movement out of neutral position in the opposite direction to effect operation of said other valve means to supply fluid under pressure to the respective control chamber and to also effect operation of said one valve means to maintain the respective control chamber open to atmosphere, and other valve means controlled by said lever operable in neutral position thereof to supply fluid under pressure to both of said second chambers and operable upon movement of said lever out of neutral position to release fluid under pressure from the said second chamber of the motor to which fluid under pressure is supplied to the control chamber while maintaining the fluid pressure supplied to said second chamber of the other motor.

9. An apparatus for controlling the starting, stopping and speed or power output of a prime mover comprising in combination, a fluid motor operable upon supply of fluid under pressure to one chamber and release of fluid under pressure from a second chamber to effect starting and operation of said prime mover at a speed proportional to the pressure of fluid in said one chamber, and operable upon release of fluid under pressure from said one chamber and supply of fluid under pressure to said second chamber to provide for stopping of said prime mover, a self-lapping fluid pressure regulating device operable to regulate the pressure of fluid in said one chamber, an operator's control lever, means responsive to movement of said lever from a certain position to effect operation of said regulating device to supply fluid to said one chamber at a pressure proportional to the extent of such movement and operable upon movement of said lever to said certain position to effect operation of said regulating device to release fluid under pressure from said one chamber, and means operable upon movement of said lever to said certain position to supply fluid under pressure to said second chamber and to establish a fluid pressure release communication for said one chamber separate from said regulating device and operable upon movement of said lever out of said certain position to release fluid under pressure from said second chamber and to effect closure of said communication.

10. A fluid motor comprising a casing, a piston in said casing, a precompressed spring in a chamber at one side of said piston acting on said piston, said piston having at the opposite side a control chamber for receiving fluid under pressure to act on said piston for adjusting said piston out of a normal position against said spring, and said spring being adapted to move said piston to said normal position upon release of fluid under pressure from said control chamber, self-lapping pressure regulating means operable to supply fluid under pressure to and release fluid under pressure from said control chamber, said casing having a passage open to said spring chamber for supplying fluid under pressure thereto to act on said piston to move same to said normal position and for releasing fluid under pressure from said spring chamber, valve means operable upon supply of fluid under pressure to said passage to open a fluid release communication from said control chamber which communication is separate from said pressure regulating means, and means operable upon release of fluid under pressure from said passage to effect operation of said valve means to close said communication.

11. An apparatus for controlling operation of a member by either one or the other of two prime movers comprising in combination, control means for each prime mover adjustable by fluid under pressure in a control chamber to vary the speed or power output of the prime mover in proportion to the pressure of such fluid and operable upon opening said chamber to atmosphere to provide for stopping of said prime mover, valve means operable to regulate the pressure of fluid in said control chamber in both of said control means, coupling means operable to connect or disconnect one of said prime movers to and from said member, a first selector device for one of said control means operable to either open the respective chamber to atmosphere or to connect same to said valve means, a second selector means for the other control means operable to either open the respective chamber to atmosphere or to connect same to said valve means, an operator's control device comprising a lever having a neutral position and being movable in either direction therefrom, a first valve device operable upon movement of said lever in one direction from neutral position to effect operation of said coupling means to connect the respective prime mover to said member and to also effect operation of said first selector means to connect said chamber in said one control means to said valve means, and operable upon movement of said lever in the opposite direction from neutral position to effect operation of said coupling means to disconnect the respective prime mover from said member and to also effect operation of said first selector means to open the chamber in said one control means to atmosphere, a second valve device operable upon movement of said lever in the opposite direction from neutral position to effect operation of said second selector means to connect said chamber in said other control means to said valve means and operable upon movement of said lever in the said one direction from neutral position to effect operation of said second selector means to open the chamber in said other control means to atmosphere, said lever being operable in neutral position to effect operation of both said first and second valve devices to open the chambers of the respective control means to atmosphere and to also effect operation of said coupling means to disconnect the respective prime mover from said member.

12. An apparatus for controlling the operation of a member by either a forward steam turbine or by a reverse steam turbine comprising in combination, a steam supply valve for each turbine operable to either cut off the supply of steam to the turbine or to supply steam to the turbine in regulated amounts, fluid pressure controlled regulating means for each supply valve operable upon opening a chamber to atmosphere to effect operation of the respective supply valve to cut off the supply of steam to the respective turbine and operable upon supply of fluid to said chamber to effect operation of the respective supply valve to supply steam to the turbine in an amount proportional to the pressure of such fluid, an operator's control device comprising a lever, fluid pressure control means operable upon movement of said lever in one direction from a neutral position to effect a supply of fluid under pressure to said chamber in one regulating means at a pressure proportional to the extent of such movement and to at the same time open said chamber in the other regulating means to atmosphere, and operable upon movement of said lever in the opposite direction from neutral position to effect a supply of fluid under pressure to said chamber in the said other regulating means at a pressure proportional to the extent of such movement and to at the same time open said chamber in the said one regulating means to atmosphere, coupling means arranged to connect or disconnect one of said turbines to or from said member, and means controlled by said lever operable upon movement thereof in said one direction from neutral position to first effect operation of said coupling means to connect the respective turbine to said member and to then effect operation of said fluid pressure control means to supply fluid under pressure to the chamber in the respective regulating means, and operable in neutral position and upon movement of said lever in the opposite direction from neutral position to effect operation of said coupling means to disconnect the respective turbine from said member.

13. An apparatus for controlling a supply of power fluid to a prime mover for operating said prime mover to drive a rotatable member in one direction only, said member being also rotatable in the opposite direction, said apparatus comprising in combination, control means operable to supply power fluid to said prime mover, interlock means responsive to rotation and stopping of said member, and means controlled by said interlock means and operable upon rotation of said member in said opposite direction to prevent supply of power fluid to said prime mover by said control means and operable upon stopping of said member and upon rotation of said member in said one direction to permit supply of power fluid to said prime mover by said control means.

14. An apparatus for controlling a supply of power fluid to a prime mover for operating said prime mover to drive a rotatable member in one direction only, said member being also rotatable in the opposite direction, said apparatus comprising in combination, control means operable to control the supply of power fluid to said prime mover, an operator's control device operable to effect operation of said control means, interlock means responsive to rotation of said member for controlling operation of said operator's control device and operable upon rotation of said member in said opposite direction to prevent operation of said operator's control device to effect operation of said control means and operable upon stopping of said member and rotation in said one direction to permit operation of said operator's control device to effect operation of said control means.

15. An apparatus for controlling a supply of power fluid to a prime mover for operating said prime mover to drive a rotatable member in one direction only, said member being also rotatable in the opposite direction, said apparatus comprising in combination, control means operable to control the supply of power fluid to said prime mover, interlock means controlled by pressure of fluid in a chamber and operative when said pressure is of a certain degree to permit supply of power fluid to said prime mover by said control means and when of a different degree to prevent supply of power fluid to said prime mover by said control means, and means for controlling operation of said interlock means controlled by said rotatable member and operable upon rotation of said member in said opposite direction to provide said different pressure and operative upon stopping of said prime mover to provide said certain pressure.

16. An apparatus for controlling a supply of power fluid to a prime mover for operating said prime mover to drive a rotatable member in one direction only, said member being also rotatable in the opposite direction, said apparatus comprising in combination, control means operable to control the supply of power fluid to said prime mover, interlock means controlled by pressure of fluid in a chamber and operable when the pressure of fluid in said chamber is of a certain degree to permit supply of power fluid to said prime mover by said control means and when less than said certain degree to prevent supply of power fluid to said prime mover by said control means, means operative to supply fluid under pressure to said chamber, and means responsive to rotation and stopping of said member and operable upon rotation of said member to release fluid under pressure from said chamber at a rate exceeding the rate of supply to thereby prevent obtaining said certain pressure in said chamber and operable upon stopping of said rotatable member to prevent such release of fluid under pressure from said chamber to thereby permit obtaining said certain pressure in said chamber.

17. An apparatus for controlling a supply of power fluid to a prime mover for operating said prime mover to drive a rotatable member in one direction only, said member being also rotatable in the opposite direction, said apparatus comprising in combination, control means adjustable to regulate the supply of power fluid to said prime mover, an operator's control device comprising a lever movable out of a certain position to effect operation of said control means to supply power fluid to said prime mover and operative in said certain position to effect operation of said control means to cut off the supply of power fluid to said prime mover, interlock means operable to prevent movement of said lever out of said certain position, and means controlled by said rotatable member for controlling said interlock means and operable with said member rotating in said opposite direction to render said interlock means effective and operable upon stopping of said member to render said interlock means ineffective.

18. An apparatus for controlling a supply of power fluid to a prime mover for operating said prime mover to drive a rotatable member in one direction only, said member being also rotatable in the opposite direction, said apparatus comprising in combination, control means adjustable to regulate the supply of power fluid to said prime mover, an operator's control device comprising a lever movable out of a certain position to effect operation of said control means to supply power fluid to said prime mover and operative in said certain position to effect operation of said control means to cut off the supply of power fluid to said prime mover, and block means movable into the path of movement of said lever to prevent movement of said lever out of said certain position, means operable by fluid at a certain pressure in a chamber to move said blocking means out of said path, means operable with fluid in said chamber at a lower pressure to move said blocking means into said path, means operable to supply fluid under pressure to said chamber, a valve operable to release fluid under pressure from said chamber at a rate exceeding the rate of said supply, and means controlled by said member operable upon rotation thereof to effect operation of said valve to release fluid under pressure from said chamber and operable upon stopping of said member to prevent release of fluid under pressure from said chamber.

19. An apparatus for controlling the supply of power fluid to a forward prime mover operable to drive a rotatable member in one direction only, and to a reverse prime mover operable to drive said member in the reverse direction only, said apparatus comprising in combination, power control means for each prime mover for controlling the supply of power fluid to the prime mover, an operator's control device comprising a lever having a neutral position, a forward control zone at one side of neutral position and a reverse control zone at the opposite side of neutral position, means operable upon movement of said lever into said forward control zone to effect operation of the power control means for said forward prime mover to supply power fluid to said forward prime mover and operable in neutral position and in said reverse control zone to effect operation of the power control means for said forward prime mover to cut off the supply of power fluid thereto, other means operable upon movement of said lever into said reverse control zone to effect operation of the power control means for said reverse prime mover to supply power fluid thereto and operable in neutral position and in said forward control zone to effect operation of the power control means for said reverse prime mover to cut off the supply of power fluid thereto, interlock means operable to prevent movement of said lever from said forward control zone past neutral position into said reverse control zone but permitting movement from neutral position back into said forward zone and also operable to prevent movement of said lever from said reverse zone past said neutral position into said forward zone but permitting movement from neutral position back into said reverse zone, and means controlled by said rotatable member for controlling said interlock means and operable upon rotation of said member to render said interlock means effective and upon stopping of said member ineffective.

20. An apparatus for controlling the supply of power fluid to a forward prime mover operable to drive a rotatable member in one direction only, and to a reverse prime mover operable to drive said member in the reverse direction only, said apparatus comprising in combination, power control means for each prime mover for controlling the supply of power fluid to the prime mover, an operator's control device comprising a lever having a neutral position, a forward control zone at one side of neutral position and a reverse control zone at the opposite side of neutral position, means operable upon movement of said lever into said forward control zone to effect operation of the power control means for said forward prime mover to supply power fluid to said forward prime mover and operable in neutral position and in said reverse control zone to effect operation of the power control means for said forward prime to cut off the supply of power fluid thereto, other means operable upon movement of said lever into said reverse control zone to effect operation of the power control means for said reverse prime mover to supply power fluid thereto and operable in neutral position and in said forward control zone to effect operation of the power control means for said reverse prime mover to cut off the supply of power fluid thereto, interlock means operable to prevent movement of said lever from said forward control zone past neutral position into said reverse control zone but permitting movement from neutral position back into said forward zone and also operable to prevent movement of said lever from said reverse zone past said neutral position into said forward zone but permitting movement from neutral position back into said reverse zone, means controlled by pressure of fluid in a chamber for controlling said interlock means and operable when the pressure in said chamber is less than a certain degree to render said interlock means effective and when at said certain degree ineffective, means operative to supply fluid under pressure to said chamber, and means responsive to rotation and stopping of said member and operable upon rotation of said member to release fluid under pressure from said chamber at a rate exceeding the rate of supply to thereby prevent obtaining said certain pressure in said chamber and operable upon stopping of said rotatable member to prevent release of fluid under pressure from said chamber to permit obtaining said certain pressure in said chamber.

21. An apparatus for controlling the supply of power fluid to a forward prime mover operable to drive a rotatable member in one direction only, and to a reverse prime mover operable to drive said member in the reverse direction only, said apparatus comprising in combination, power control means for each prime mover for controlling the supply of power fluid to the prime mover, an operator's control device comprising a lever having a neutral position, a forward control zone at one side of neutral position and a reverse control zone at the opposite side of neutral position, means operable upon movement of said lever into said forward control zone to effect operation of the power control means for said forward prime mover to supply power fluid to said forward prime mover and operable in neutral position and in said reverse control zone to effect operation of the power control means for said forward prime mover to cut off the supply of power fluid thereto, other means operable upon movement of said lever into said reverse control zone to effect operation of the power control means for said reverse prime mover to supply power fluid thereto and operable in neutral position and in said forward control zone to effect operation of the power control means for said reverse prime mover to cut off the supply of power fluid thereto, interlock means operable to prevent movement of said lever from said forward control zone past neutral position into said reverse control zone but permitting movement from neutral position back into said forward zone and also operable to prevent movement of said lever from said reverse zone past said neutral position into said forward zone but permitting movement from neutral position back into said reverse zone, means controlled by pressure of fluid in a chamber for controlling said interlock means and operable when the pressure in said chamber is less than a certain degree to render said interlock means effective and when at said certain degree ineffective, valve means operable upon movement of said lever into neutral position to supply fluid pressure to said chamber and operable in said forward and reverse zones to release fluid under pressure from said chamber, and control means controlling a release communication from said chamber for releasing fluid under pressure from said chamber at a rate exceeding the rate of supply by said valve means, said control means being controlled by said rotatable member and being operable upon rotation of said rotatable member to open said release communication and upon stopping of said rotatable member to close said release communication.

22. An apparatus for controlling operation of a rotatable member in one direction by a forward prime mover and in the reverse direction by a reverse prime mover, comprising in combination, an operator's control device comprising a lever having a neutral position and being movable in one direction from neutral position to a forward selection position and being further movable into a forward speed regulating zone, said lever being movable in the opposite direction from neutral position first into a reverse selection position and then into a reverse speed regulating zone, speed regulating means operable by said lever in said forward and reverse zones for governing the speed or power output of said prime movers, selector means operable upon movement of said lever into said forward selecting position and into said forward zone to render said forward prime mover controllable by said speed regulating means and to render said reverse prime mover nonoperable and operable upon movement of said lever into said reverse selecting position and into said reverse zone to render said reverse prime mover controllable by said speed regulating means and to render said forward prime mover nonoperable, said selector means being operable in neutral position of said lever to render both said forward and said reverse prime movers nonoperable, coupling means for connecting and disconnecting said reverse prime mover to and from said member controlled by said selector means and operable upon movement of said lever into said reverse selection position and reverse zone to connect the respective prime mover to said member and operable in all other positions of said lever to disconnect the respective prime mover from said member, means operable to permit movement of said lever between neutral position and said forward speed control zone but to prevent movement past neutral position in the direction of said reverse selection position and also operable to permit movement of said lever between said reverse speed control zone and neutral position but to prevent movement past neutral position in the direction of said forward selection position, valve means controlled by said selector means operable in all positions of said lever except neutral position to render said blocking means effective, and stop detecting means rendered responsive to the condition of said rotatable member upon movement of said lever to neutral position and operable upon rotation of said member to render said blocking means effective and upon stopping of said member to render said blocking means ineffective, said stop detecting means being rendered non-responsive to the condition of said rotatable member with said lever out of neutral position.

HARRY C. MAY.

REFERENCES CITED

The following references are of record in the file of this patent:

UNITED STATES PATENTS

| Number | Name | Date |
|---|---|---|
| 1,466,839 | Klee | Sept. 4, 1926 |
| 1,824,515 | Traphagen | Sept. 22, 1931 |
| 1,899,396 | Ray | Feb. 28, 1933 |
| 1,942,180 | Martin | Jan. 2, 1934 |
| 1,986,416 | Hanzlik | Jan. 1, 1935 |
| 2,143,533 | Archea | Jan. 10, 1939 |
| 2,155,218 | Cain | Apr. 18, 1939 |
| 2,383,278 | Stevens | Aug. 21, 1945 |
| 2,388,357 | Hewitt | Nov. 6, 1945 |